United States Patent
Patton

(10) Patent No.: US 12,246,975 B2
(45) Date of Patent: Mar. 11, 2025

(54) CARBON SEQUESTRATION SYSTEMS IN CONJUNCTION WITH OIL AND GAS OPERATIONS

(71) Applicant: HYDROZONIX, LLC, Conroe, TX (US)

(72) Inventor: Mark Patton, Conroe, TX (US)

(73) Assignee: HYDROZONIX, LLC, Conroe, TX (US)

( * ) Notice: Subject to any disclaimer, the term of this patent is extended or adjusted under 35 U.S.C. 154(b) by 0 days.

(21) Appl. No.: 18/388,890

(22) Filed: Nov. 13, 2023

(65) Prior Publication Data
US 2024/0132384 A1   Apr. 25, 2024

Related U.S. Application Data

(63) Continuation-in-part of application No. 17/983,161, filed on Nov. 8, 2022, now abandoned, and a
(Continued)

(51) Int. Cl.
*C02F 1/78* (2023.01)
*C02F 1/00* (2023.01)
(Continued)

(52) U.S. Cl.
CPC ............ *C02F 1/78* (2013.01); *C02F 1/00* (2013.01); *C02F 1/24* (2013.01); *C02F 1/40* (2013.01);
(Continued)

(58) Field of Classification Search
CPC ...... C02F 1/78; C02F 1/00; C02F 1/24; C02F 1/40; C02F 2101/101; C02F 2101/32;
(Continued)

(56) References Cited

U.S. PATENT DOCUMENTS

| 5,484,279 A | 1/1996 | Vonasek |
| 5,527,465 A | 6/1996 | Dickerson |

(Continued)

FOREIGN PATENT DOCUMENTS

| JP | 201843176 A | 3/2018 | |
| WO | WO-2014089443 A1 * | 6/2014 | ............ B01D 61/04 |

(Continued)

OTHER PUBLICATIONS

International Search Report and Written Opinion, PCT/US2021/019088 (Hydrozonix, LLC) (international filing date Feb. 22, 2021).

(Continued)

*Primary Examiner* — James G Sayre
(74) *Attorney, Agent, or Firm* — Wayne Edward Ramage; Baker Donelson

(57) ABSTRACT

Methods and systems for carbon sequestration in conjunction with oil and gas operations. Carbon dioxide in the form of nanobubbles is used to supersaturate treated produced water. The supersaturated produced water is then injected into Class II injection wells for effective storage in underground formations in conjunction with enhanced recovery operations or the storage and disposal of produced water from production operations.

18 Claims, 29 Drawing Sheets

Related U.S. Application Data continuation-in-part of application No. 17/522,645, filed on Nov. 9, 2021, and a continuation-in-part of application No. 17/181,867, filed on Feb. 22, 2021, and a continuation-in-part of application No. 16/858,476, filed on Apr. 24, 2020, now Pat. No. 12,071,359, said application No. 17/983,161 is a continuation of application No. 16/701,210, filed on Dec. 3, 2019, now Pat. No. 11,492,278, said application No. 17/522,645 is a continuation of application No. 16/661,899, filed on Oct. 23, 2019, now Pat. No. 11,168,544, said application No. 16/701,210 is a continuation of application No. 16/246,646, filed on Jan. 14, 2019, now Pat. No. 11,040,900, and a continuation of application No. PCT/US2019/013431, filed on Jan. 14, 2019.

(60) Provisional application No. 63/548,180, filed on Nov. 11, 2023, provisional application No. 62/978,893, filed on Feb. 20, 2020, provisional application No. 62/749,148, filed on Oct. 23, 2018, provisional application No. 62/749,150, filed on Oct. 23, 2018, provisional application No. 62/731,748, filed on Sep. 14, 2018, provisional application No. 62/617,258, filed on Jan. 14, 2018.

(51) Int. Cl.
*C02F 1/24* (2023.01)
*C02F 1/40* (2023.01)
*C02F 103/10* (2006.01)
*E21B 43/26* (2006.01)
*E21B 43/40* (2006.01)

(52) U.S. Cl.
CPC .......... *E21B 43/2607* (2020.05); *E21B 43/40* (2013.01); *C02F 2103/10* (2013.01); *C02F 2201/008* (2013.01); *C02F 2201/784* (2013.01); *C02F 2303/04* (2013.01)

(58) Field of Classification Search
CPC ............ C02F 2103/10; C02F 2103/365; C02F 2201/007; C02F 2201/008; C02F 2201/784; C02F 2209/001; C02F 2209/006; C02F 2209/008; C02F 2303/04; C02F 2303/26; E21B 43/2607; E21B 43/40
See application file for complete search history.

(56) References Cited

U.S. PATENT DOCUMENTS

| | | |
|---|---|---|
| 5,958,240 A | 11/1999 | Hoel |
| 8,919,743 B2 | 12/2014 | Osborn et al. |
| 9,315,403 B1 | 4/2016 | Laur et al. |
| 2005/0249631 A1 | 11/2005 | Schulz et al. |
| 2006/0243344 A1 | 11/2006 | Nilsen |
| 2008/0237141 A1* | 10/2008 | Kerfoot .................. E21B 43/20 210/150 |
| 2009/0101572 A1 | 4/2009 | Sullivan et al. |
| 2009/0107917 A1* | 4/2009 | Capehart .................. C02F 9/00 210/207 |
| 2009/0152209 A1 | 6/2009 | Agrawal |
| 2009/0202304 A1* | 8/2009 | Koide ................ B01D 53/1475 405/129.2 |
| 2009/0206019 A1 | 8/2009 | Lacasse |
| 2010/0264068 A1 | 10/2010 | Ikebe et al. |
| 2011/0017456 A1 | 1/2011 | Koide et al. |
| 2011/0186526 A1 | 8/2011 | McGuire et al. |
| 2012/0080374 A1 | 4/2012 | Komor et al. |
| 2013/0229889 A1 | 9/2013 | Osborn et al. |
| 2013/0313191 A1 | 11/2013 | Wolf et al. |
| 2014/0326677 A1 | 11/2014 | Kinasewich et al. |
| 2014/0346118 A1 | 11/2014 | Folkvang |
| 2015/0368137 A1* | 12/2015 | Miller ...................... C02F 1/66 210/709 |
| 2016/0060149 A1 | 3/2016 | Scott et al. |
| 2016/0221842 A1 | 8/2016 | Rau, III |
| 2018/0319685 A1 | 11/2018 | Ball et al. |
| 2019/0093463 A1 | 3/2019 | Hardin et al. |
| 2020/0290935 A1 | 9/2020 | Goode et al. |

FOREIGN PATENT DOCUMENTS

| | | | | |
|---|---|---|---|---|
| WO | WO-2014138011 A1 * | 9/2014 | ............... | B03C 1/02 |
| WO | 2019112492 A1 | 6/2019 | | |
| WO | 2020006636 A1 | 1/2020 | | |
| WO | 2020234464 A1 | 11/2020 | | |

OTHER PUBLICATIONS

International Search Report and Written Opinion, PCT/US2020/029952 (Hydrozonix, LLC) (international filing date Apr. 24, 2020).
International Search Report and Written Opinion, PCT/US2019/013431 (Hydrozonix, LLC) (international filing date Jan. 14, 2019).
Extended European Search Report, EP 21757546.3 (PCT/US2021019088) (Hydrozonix, LLC) (Oct. 9, 2023).

* cited by examiner

CARBON SEQUESTRATION SYSTEMS IN CONJUNCTION WITH OIL AND GAS OPERATIONS

This application is a continuation-in-part of U.S. patent application Ser. No. 17/983,161, filed Nov. 8, 2022, which is a continuation of U.S. patent application Ser. No. 16/701,210, filed Dec. 2, 2019, now U.S. Pat. No. 11,492,278, issued Nov. 8, 2022, which is a continuation of U.S. patent application Ser. No. 16/246,646, filed Jan. 14, 2019, now U.S. Pat. No. 11,040,900, issued Jun. 22, 2012, with U.S. patent application Ser. No. 16/701,210 also being a continuation of PCT Patent Application No. PCT/US19/13431, filed Jan. 14, 2019, with both U.S. patent Ser. No. 16/246,646 and PCT/US19/13431 claiming benefit of and priority to U.S. Provisional Applications No. 62/749,150, filed Oct. 23, 2018, No. 62/731,748, filed Sep. 14, 2018, and No. 62/617,258, filed Jan. 14, 2018; this application also is a continuation-in-part of U.S. patent application Ser. No. 17/522,645, filed Nov. 9, 2021, which is a continuation of U.S. patent application Ser. No. 16/661,899, filed Oct. 23, 2019, now U.S. Pat. No. 11,168,544, issued Nov. 9, 2021, which claims benefit of and priority to U.S. Provisional Application No. 62/749,148, filed Oct. 23, 2018; this application also is a continuation-in part of U.S. patent application Ser. No. 16/858,476, filed Apr. 24, 2020, which claims benefit of and priority to U.S. Provisional Application No. 63/838,195, filed Apr. 24, 2019; this application also is a continuation-in-part of U.S. patent application Ser. No. 17/181,867, filed Feb. 22, 2021, which claims benefit of and priority to U.S. Provisional Application No. 62/978,893, filed Feb. 20, 2020; this application also claims benefit of and priority to U.S. Provisional App. No. 63/548,180; all of the above-listed applications and patents are incorporated herein in their entireties by specific reference for all purposes.

FIELD OF INVENTION

This invention relates to an apparatus and systems and related methods for carbon sequestration. More particularly, this invention relates to an apparatus and systems and related methods for carbon sequestration that may be used in conjunction with oil and gas operations.

BACKGROUND OF THE INVENTION

A variety of oil and gas operations generate large volumes of water mixed with hydrocarbons and various contaminants, generally referred to in the industry as "produced water." Most produced water is contaminated with inorganic salts, metals, organic compounds, and other materials, such as emulsifiers or other agents that may be injected for various types of enhanced recovery operations. Typical hydrocarbons in produced water include semivolatile organic compounds ("SVOCs") and volatile organic compounds ("VOCs"). In most operations, produced water is treated by a variety of means to separate hydrocarbons from the fluid stream, and remove or treat contaminants before ultimate disposal. Examples of systems and methods for treating produced water are described in Sullivan, et al., US 2009/0101572, Ikebe, et al., US 2010/0264068, Folkvang, US 2014/0346118, Patton, U.S. patent application Ser. No. 16/246,646, filed Mar. 22, 2019, and Patton, U.S. patent application Ser. No. 16/701,210, filed Dec. 3, 2019, all of which are incorporated herein in their entireties by specific reference for all purposes.

Patton, U.S. patent application Ser. No. 16/661,899, filed Oct. 23, 2019, which is incorporated herein in its entirety by specific reference for all purposes, describes an automated treatment system that injects an apparatus and system for dynamically treating injection fluids or fracturing fluids or produced fluids with micro-bubbles and/or nano-bubbles for various oil and gas operations, including, but not limited to, produced water or salt water disposal/injection wells, waterflooding or other forms of enhanced oil recovery (EOR) operations, and hydraulic fracturing operations.

SUMMARY OF THE INVENTION

In various exemplary embodiments, the present invention comprises systems and related methods for carbon sequestration, independently and/or in conjunction with oil and gas operations, including, but not limited to, production operations, enhanced recovery operations, and the treatment and storage or disposal of produced water from petroleum hydrocarbon operations. In one embodiment, the present invention comprises a nanobubble delivery system to store carbon, typically in the form of carbon dioxide ($CO_2$) nanobubbles (i.e., "carbon sequestration"). As described in detail below, produced water is generated as a byproduct of oil and gas extraction. Carbon dioxide is highly soluble in water, but solubility is reduced at higher temperatures and/or salinities. Produced water at the wellhead often is in excess of 100 degrees F. In the present invention, carbon dioxide is introduced to produced water in the form of nanobubbles.

Gases introduced into water form bubbles. Depending on the size of the bubbles and the solubility and stability of the gases, the bubbles may rise to the surface and produce "off gas," or may go into solution or be dissolved in the water. This process is dependent on the pressure and temperature of the water. Very small bubbles, called "nanobubbles," generally stay in suspension in the fluid, do not rise to the surface, and rely more on Brownian Motion for movement. Nanobubbles are also very stable and will remain in the water (or other fluid) for long periods of time (the stability of the particular gas being a factor). Nanobubbles also allow for much higher concentrations of gases to be introduced well beyond the saturation point, thereby allowing for supersaturated concentrations of the gas.

In water, carbon dioxide often will convert to carbonates, bicarbonates, and carbonic acid. This converted carbon dioxide does not enter the atmosphere as carbon dioxide gas. This process can be accelerated catalytically to form compounds such as calcium carbonate. In water storage systems, the formation of carbonates often increases the likelihood of "scaling" (although the use of scale inhibitors in oilfield water management can mitigate this). However, this concern is further mitigated as carbon dioxide in nanobubble form will itself help prevent scaling.

In further embodiments, various embodiments of the carbon sequestration system may be used in conjunction with an automated treatment system that injects ozone or an ozone-oxygen mixture into produced water upstream of the separators, with the dose rate changing dynamically as the produced water quality changes (as determined by continuous monitoring of the produced water quality by a plurality of sensors that detect water quality parameters in real time). In several embodiments, the system may operate as a "slipstream" injection system, that draws a portion of produced water from the produced water pipeline and injects ozone or an ozone-oxygen mixture into the drawn portion before injecting it back into the pipeline without disrupting or slowing normal operations. Disinfectants or other additives may also be injected. The ozone is consumed rapidly by bacteria, iron, sulfides and other reducers in the produced water stream, while the oxygen bubbles in the produced water provides an Induced Gas Flotation (IGF) effect in the downstream separators. The IGF effect clarifies the water by removing suspended matter in the produced water, such as oil or solids. The oxygen bubbles provide lift, floats lighter solids, and improves the oil/water separation process.

In the ozone generation process, oxygen is separated from ambient air, with the remaining "reject gas" typically vented to the atmosphere in prior art operations. In the present process, the reject gas instead is directed to the separation tanks, where it is used as a blanket gas in the tanks. The reject gas comprises mostly nitrogen and thus is inert, and is used as a gas phase maintained above the liquid (i.e., produced water) in the separation tanks or other vessels to protect the liquid from air contamination and to reduce the hazard of explosion or fire. Some or all of the reject gas (i.e., in conjunction with, or as an alternative to, the use of the reject gas as a blanket gas) may also be injected into the produced water or fluid stream using a nano-bubble diffuser prior to disposal in an injection well. The nano-bubble diffuser introduces the inert gas (mostly nitrogen) into the produced water in the form of micro- or nano-bubbles, which provide friction reduction in the fluid, and reduces the injection/disposal well pump pressure.

Various combined systems may introduce ozone/oxygen just prior to injection for "on-the-fly" disinfection and treatment, while also providing friction reduction benefits, in combination with a secondary system that introduces nitrogen or nitrogen-rich gas in the form of micro- and/or nano-bubbles (through nano-bubble diffusers) to increase or optimize friction reduction. The nitrogen nano-bubble delivery system also may be used independently as an "on-the-fly" stand-alone friction reduction system. A nitrogen concentrator also may be used to add nitrogen or increase the nitrogen concentration in a gas prior to forming the bubbles.

In further embodiments, during the ozone/oxygen injection step described above, some of the oxygen in larger bubbles will phase separate and create gas pockets within the pipeline. This gas typically off-gasses at the first release point. By use of a de-aerator (e.g., a riser under a vacuum), separated oxygen may be recovered and reinjected using a nano/micro-bubble type injection system. This will allow the oxygen to stay in suspension and provide additional treatment/oxidation from the reinjected oxygen. This oxygen gas stream may be reinjected upstream of the treatment by the main system to provide pre-treatment. Alternatively, such as when pre-treatment is not necessary, the injected oxygen gas can be added post-treatment as a pre-aeration step for produced water going into a storage system. Produced water going into a storage system is typically aerated to preserve the water. This posttreatment option will reduce and possibly eliminate the need for aeration during the storage phase.

Aeration is a process of introducing oxygen into water to help control bacteria and improve the overall quality of the water. In the management of produced water, aeration is used as a pre-treatment to oxidation and to preserve disinfection. The higher temperature of produced water from the wellhead can be reduced through the process of aeration. This reduction in temperature allows more carbon dioxide to be absorbed by the produced water. This absorption process can be accelerated by adding carbon dioxide to the airstream used in the aeration process. Aeration in accordance with the present invention allows for additional carbon sequestration by decreasing the temperature of the produced water, and increasing the concentration of carbon dioxide introduced to the produced water.

DETAILED DESCRIPTION OF EXEMPLARY EMBODIMENTS

Figure 1:
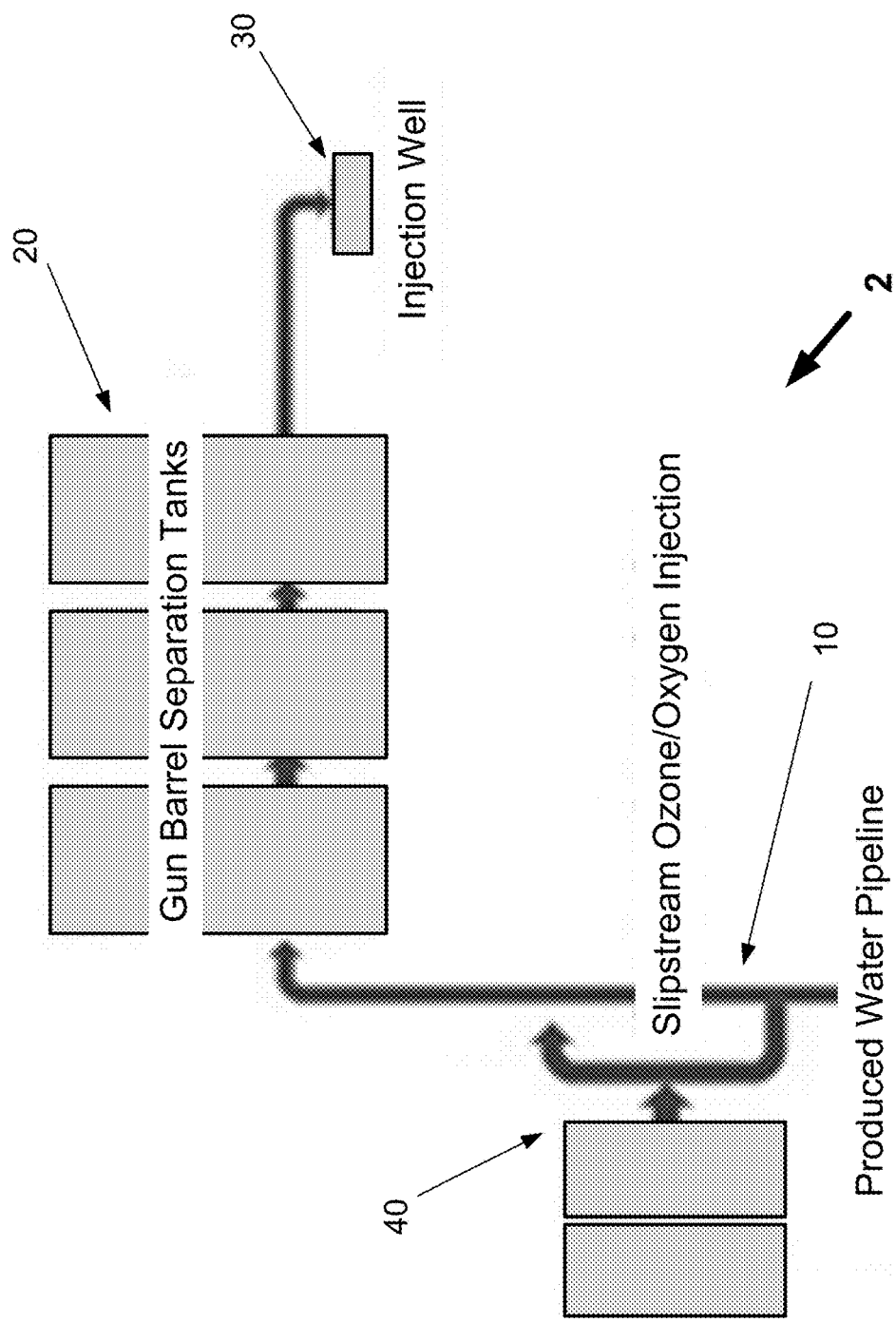
FIG. 1 shows a diagram of an exemplary embodiment of the present invention.

Produced water originates at the wellhead, and then typically travels via pipeline to tank batteries, where held for a gathering system for processing and treatment. In general, oil or other hydrocarbons are separated and collected, and the remaining wastewater is directed to an injection or disposal well 30. One of the most common oil/water separation systems use one or more "gun barrel" separation tanks 20, as seen in FIG. 1.

As the produced water travels from the wellhead and through the gathering system, it is subjected to various treatments or processes. For example, the produced water receives injections of chemicals at or near the well head, either in batch or continuous treatments. As the produced water slows down in the gun barrel separators 20, bacteria can accumulate, and hydrogen sulfide can form. To counter this, biocidal agents typically are added upstream of the gun barrel separators. Chemical biocides generally are added at a predetermined, constant dose rate, but as produced water quality changes, this constant dose rate becomes ineffective.

In several embodiments, the present invention comprises an automated treatment system 2 that injects ozone or an ozone-oxygen mixture 40 upstream of the separators, with the dose rate changing dynamically as the produced water quality changes (as determined by continuous monitoring of the produced water quality). While ozone-oxygen may be added directly, in a preferred embodiment, as seen in FIG. 1, the system may operate as a "slipstream" injection system 40, that draws a portion of produced water from the produced water pipeline and injects ozone or an ozone-oxygen mixture into this drawn-off portion, which is then introduced back into the main produced water pipeline without disrupting or slowing normal operations. Disinfectants or other additives may also be injected into the drawn-off portion (or directly into the main produced water pipeline).

The ozone is consumed rapidly by bacteria, iron, sulfides and other reducers in the produced water stream, while the oxygen bubbles in the produced water provides an Induced Gas Flotation (IGF) effect in the downstream separators. The IGF effect clarifies the water by removing suspended matter in the produced water, such as oil or solids. The oxygen bubbles adhere to suspended matter, provide lift, floats lighter solids to the surface of the water, and improves the oil/water separation process.

Figure 2:
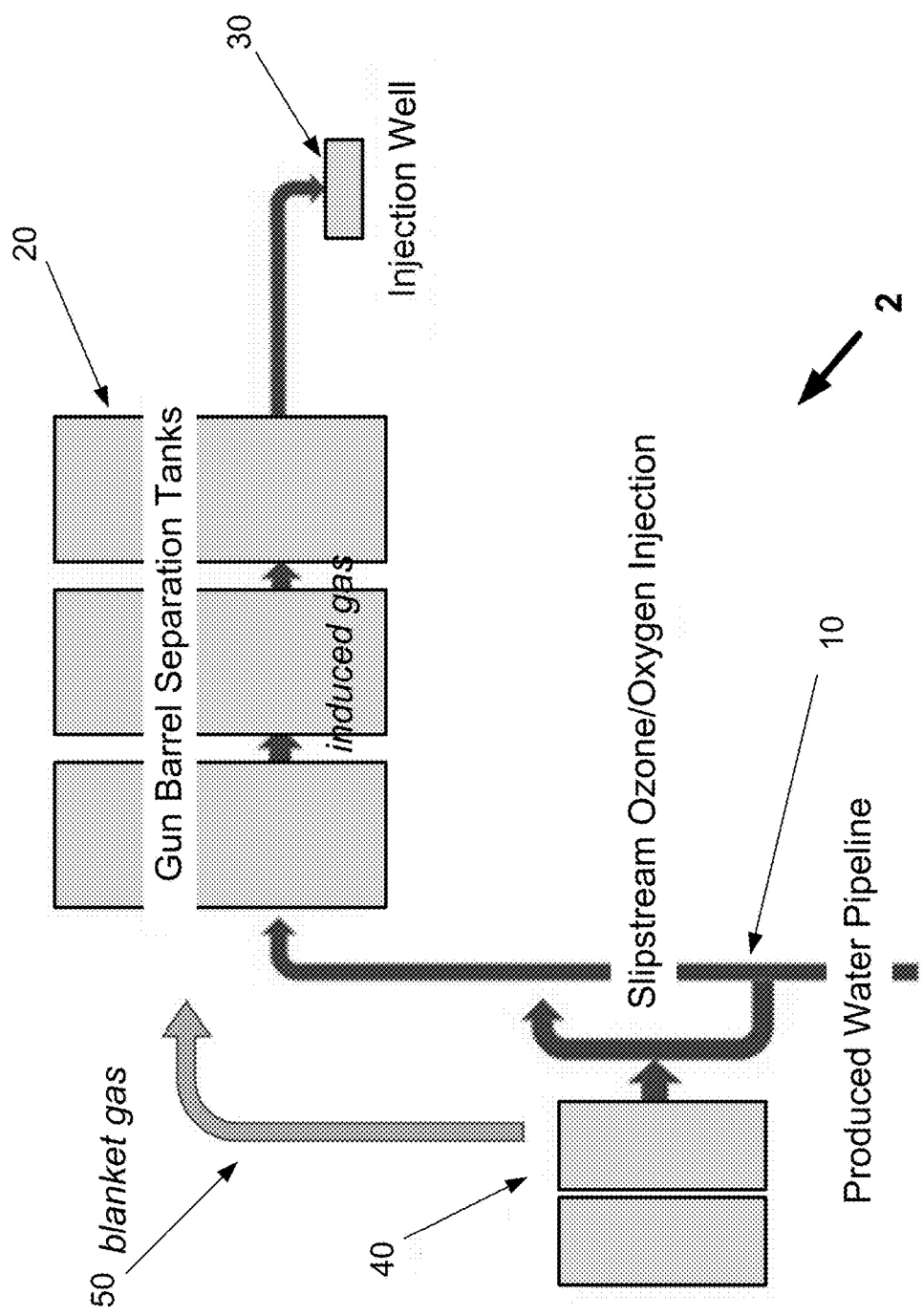
FIG. 2 shows a diagram of another exemplary embodiment of the present invention.

In the ozone generation process, oxygen is separated from ambient air, with the remaining "reject gas" (i.e., the oxygen-depleted ambient air left after separation) typically vented to the atmosphere in prior art operations. In several embodiments of the present process, this reject gas instead is directed to the separation tank 20, where it is used as a blanket gas 50 in the tanks, as seen in FIG. 2. This reject gas comprises mostly nitrogen and thus is inert, and is used as a gas phase maintained above the liquid (i.e., the produced water being treated) in the separation tanks or other vessels to protect the liquid from air contamination and to reduce the hazard of explosion or fire.

Figure 3:
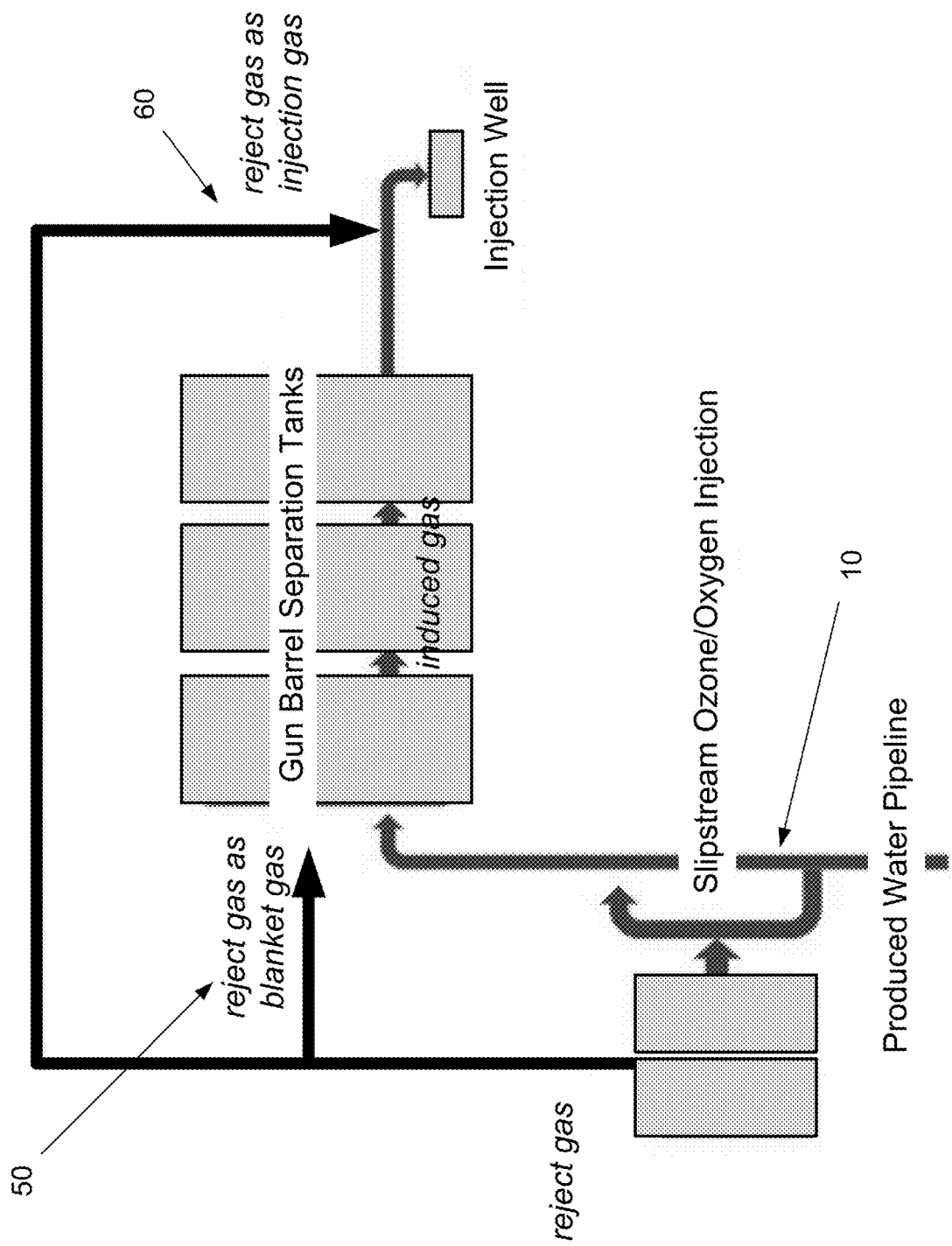
FIG. 3 shows a diagram of an embodiment with reject gas injection.
Figure 4:
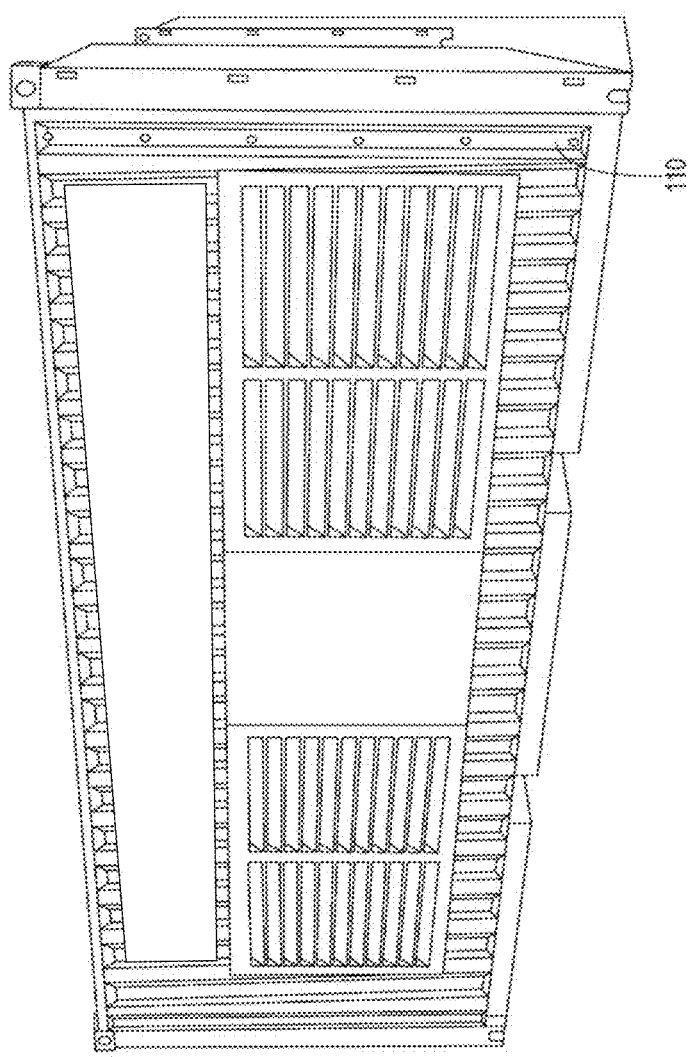
FIGS. 4-10 show exterior and interior views of single and dual unit embodiments of the present invention.
Figure 5:
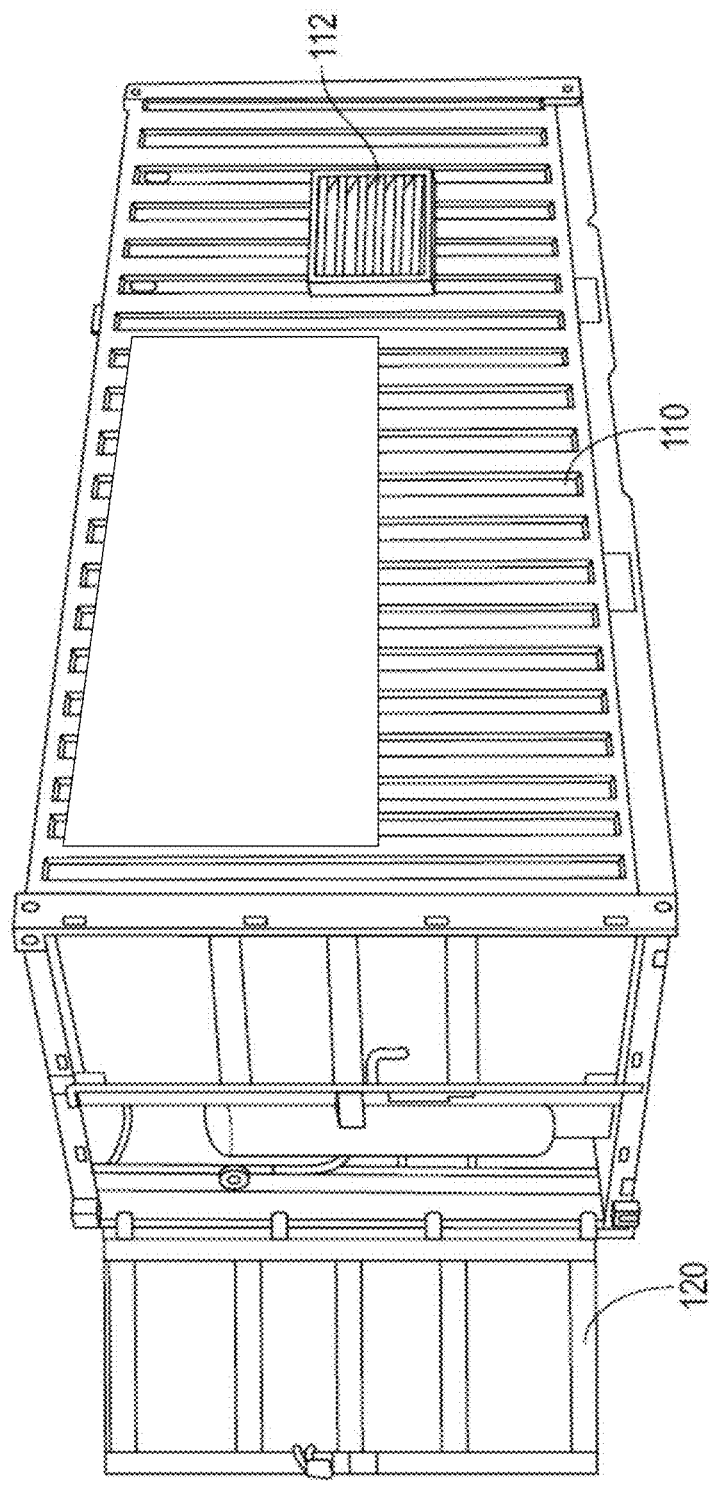
Figure 6:
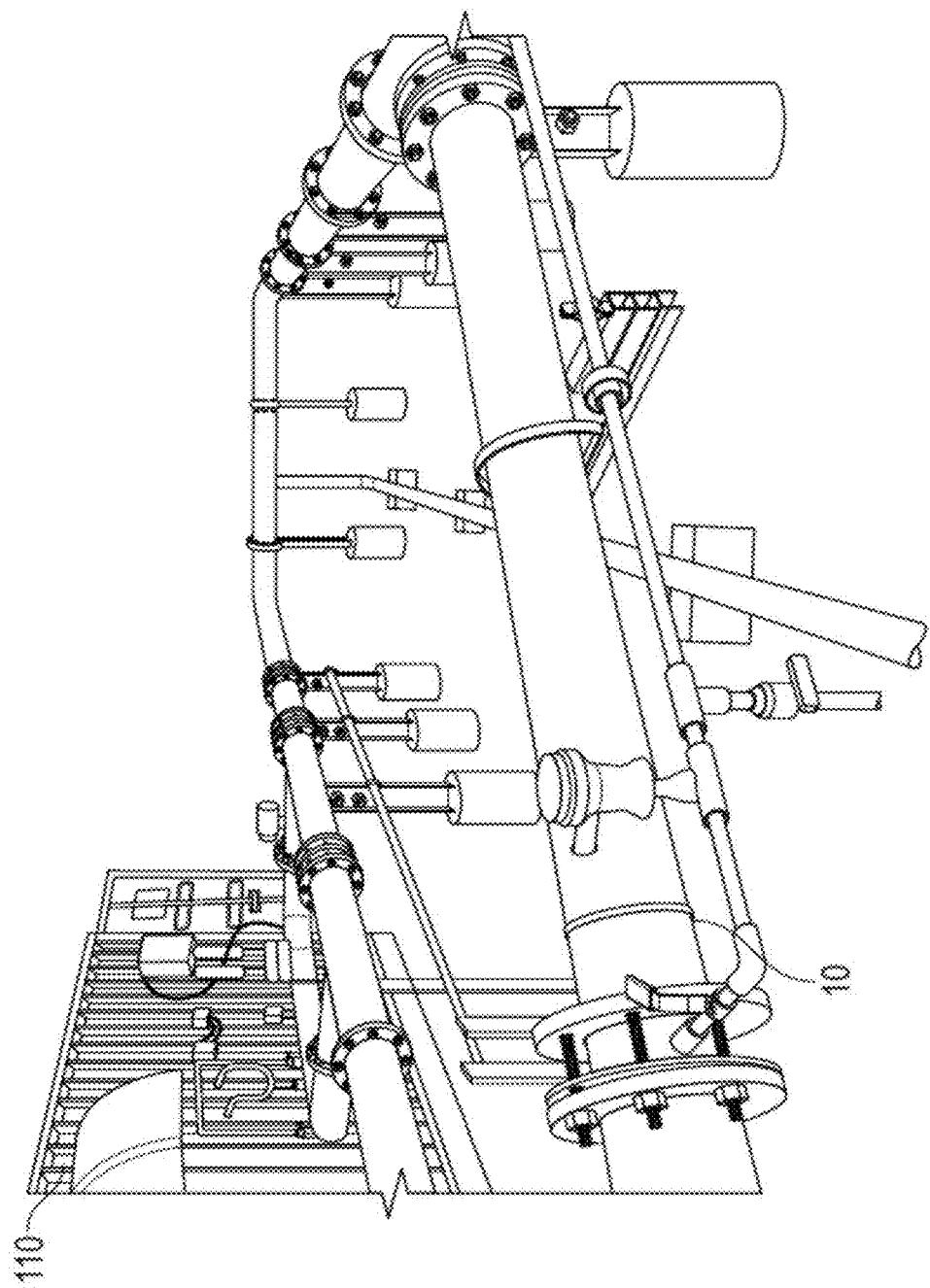
Figure 7:
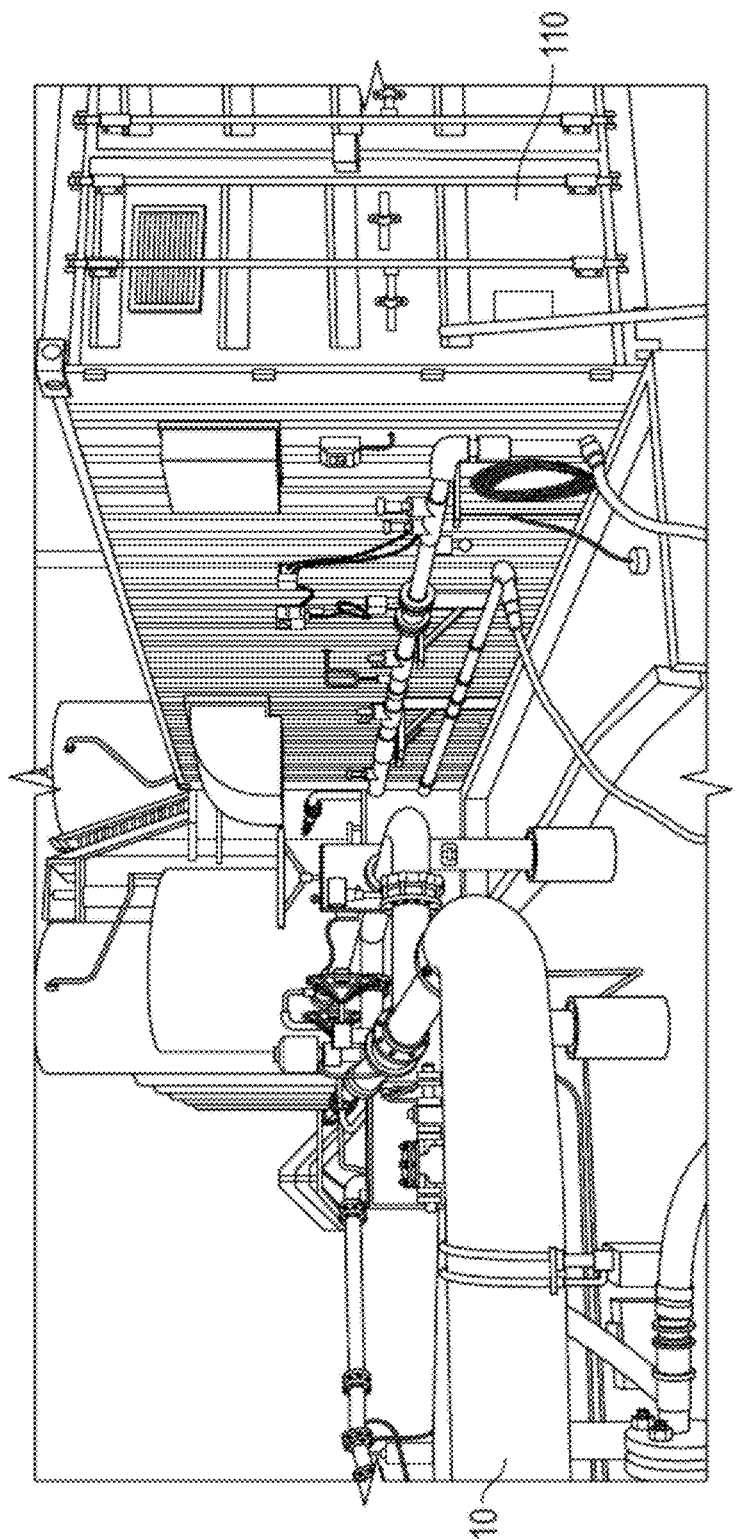

In yet a further embodiment, as seen in FIG. 3, some or all of the reject gas (i.e., in conjunction with, or as an alternative to, the use of the reject gas as a blanket gas 50) may also be injected 60 into the produced water or fluid stream using a nano-bubble diffuser prior to disposal in the injection well 30. The nano-bubble diffuser introduces the inert gas (mostly nitrogen) into the produced water in the form of micro- or nano-bubbles, which provide friction reduction in the fluid being injected into the injection/disposal well, and reduces the injection/disposal well pump pressure.

While the system may be a permanently installed component of a produced water treatment facility, in various alternative embodiments, as seen in FIGS. 4-10, the system is contained in one or more portable, movable containers or trailers 110 with ventilation 112, such as a modified shipping container or wheeled trailer. One or more doors 120 allow user access to the interior, which contains the components of the system.

Figure 11:
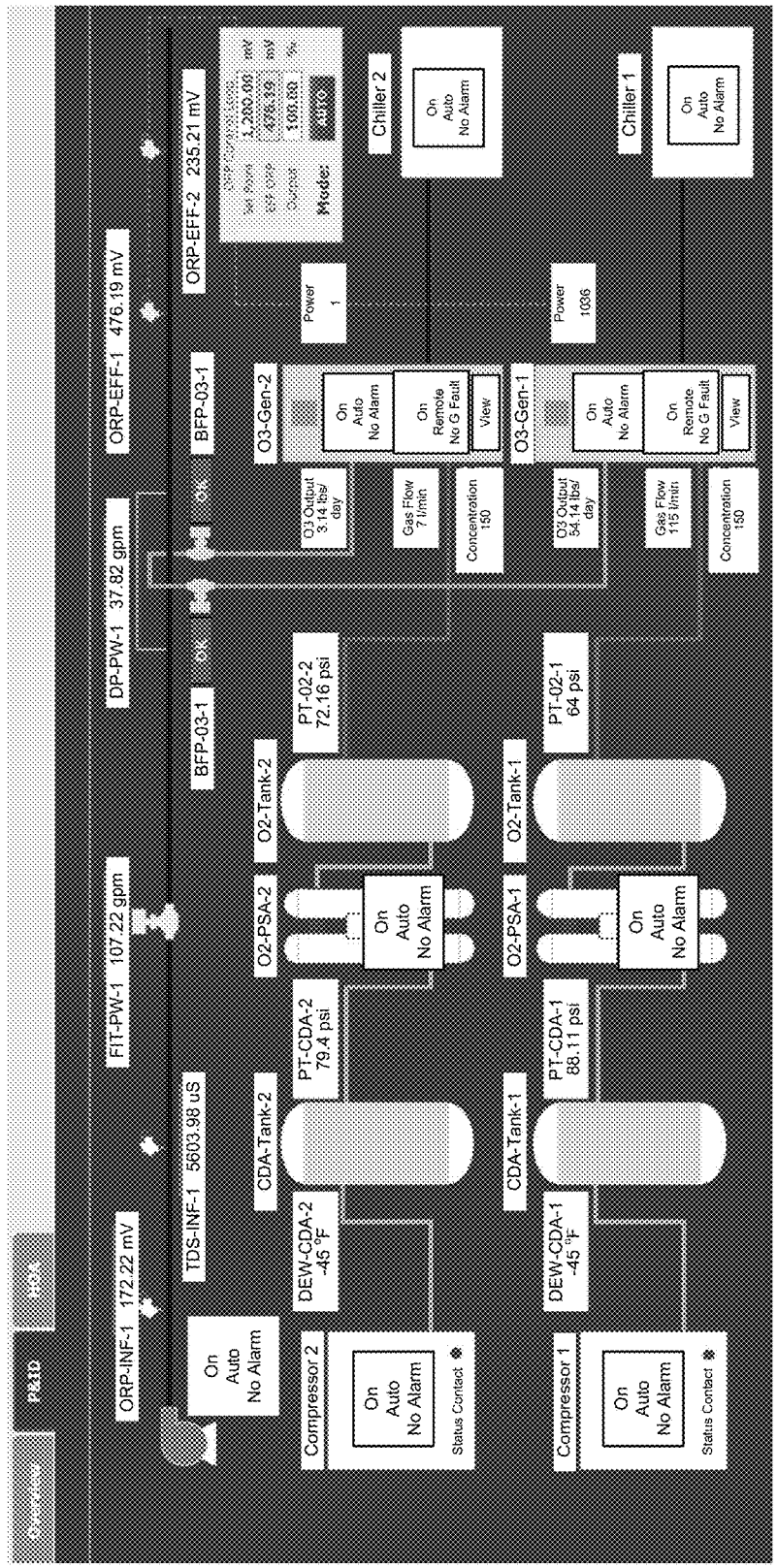
FIG. 11 shows an example of a system status display screen.

The container/trailer is moved to a desired location next to a section of the produced water pipeline, and fluid connection is made. The present system can thus be easily retro-fitted to existing produced water treatment facilities, removed when operations are terminated, or moved from location to location as needed. The system is fully automatic once installed, monitoring water quality and adjusting disinfectant and oxidation dosages automatically as water quality changes, and can be monitored and operated remotely, using a remote computer or mobile computing device (e.g., cell phone, tablet) (an example of a system monitoring display 122 is shown in FIG. 11).

Figure 8:
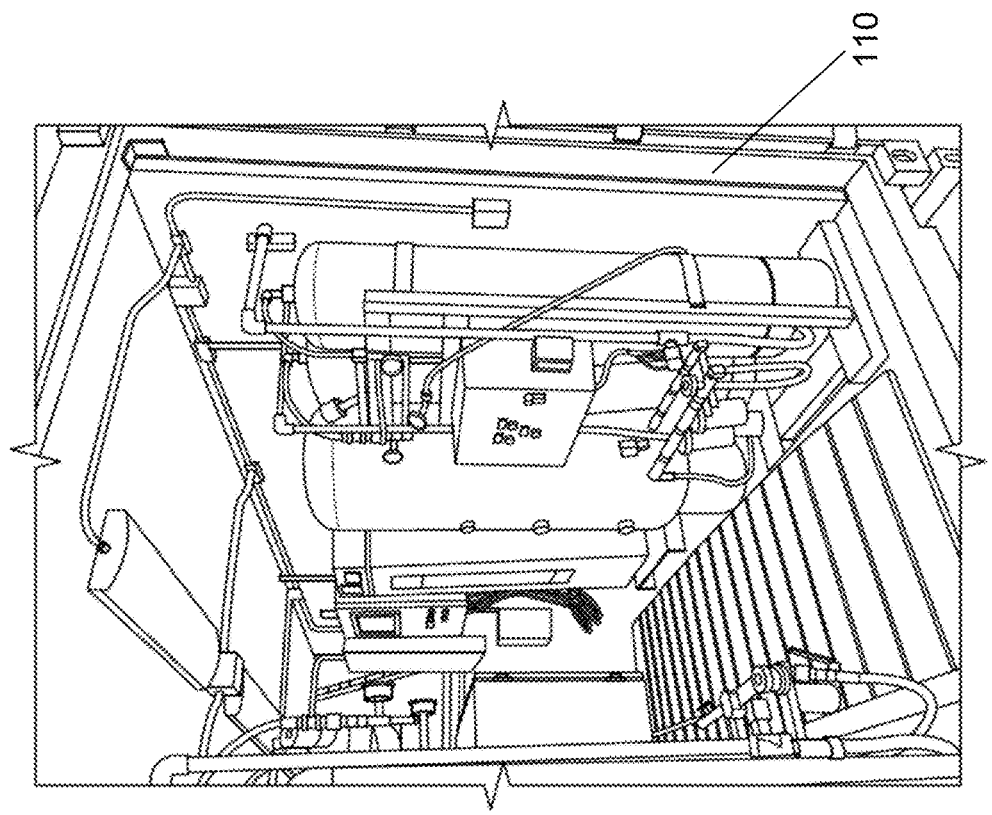
Figure 8:
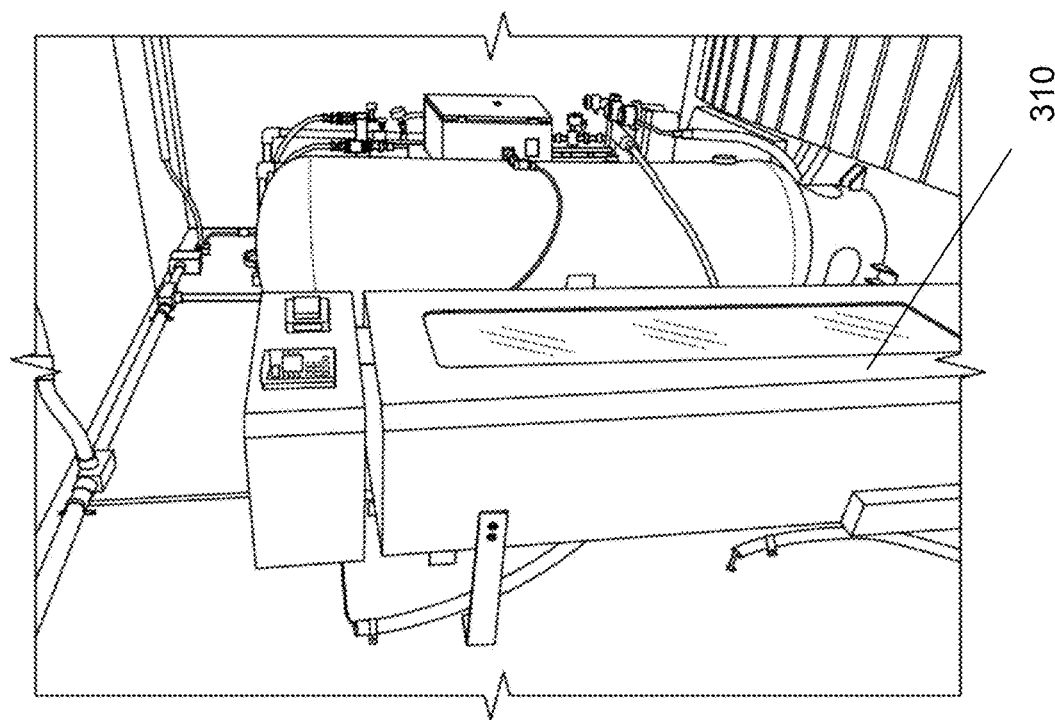
Figure 9:
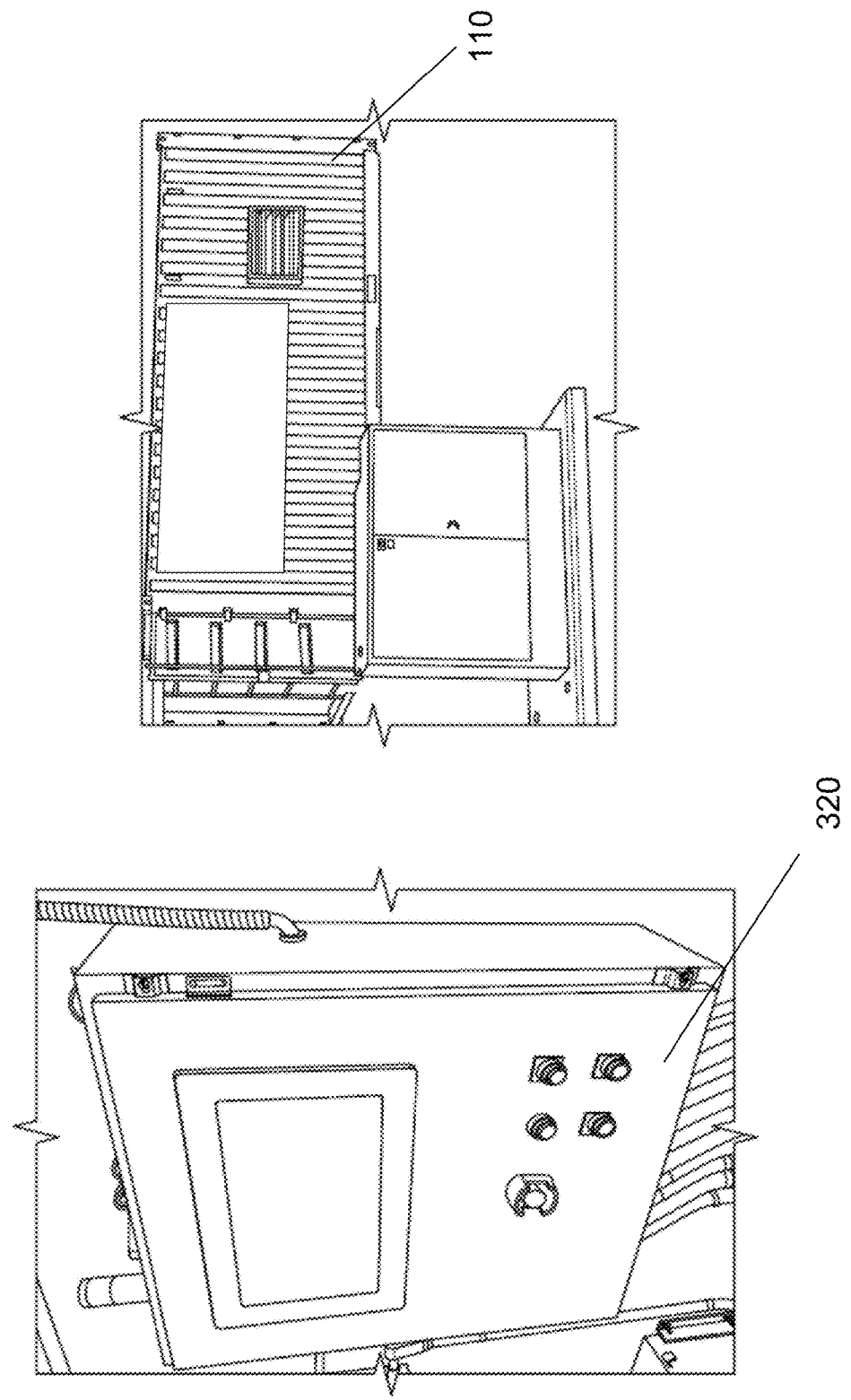
Figure 10:
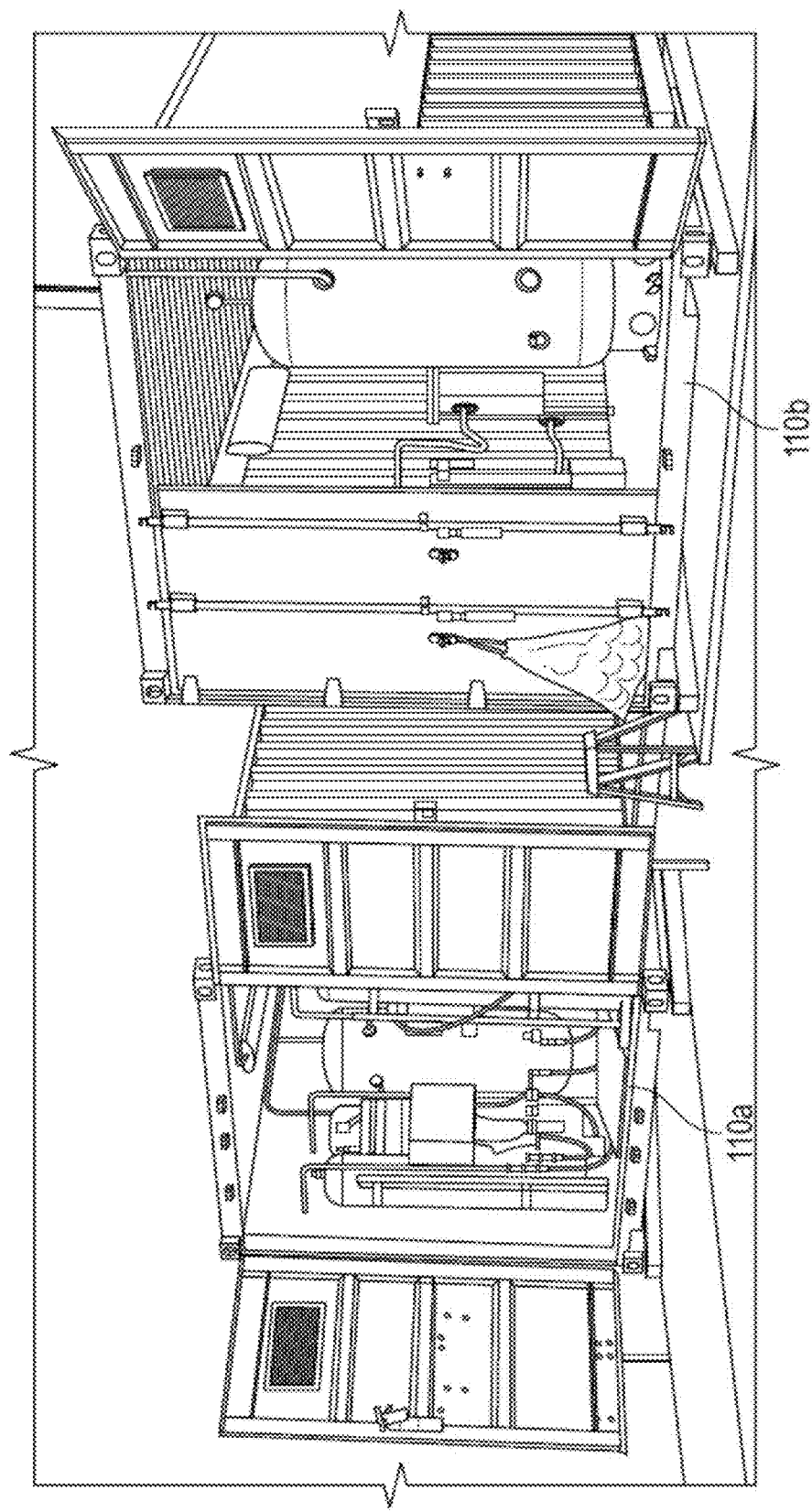
Figure 12:
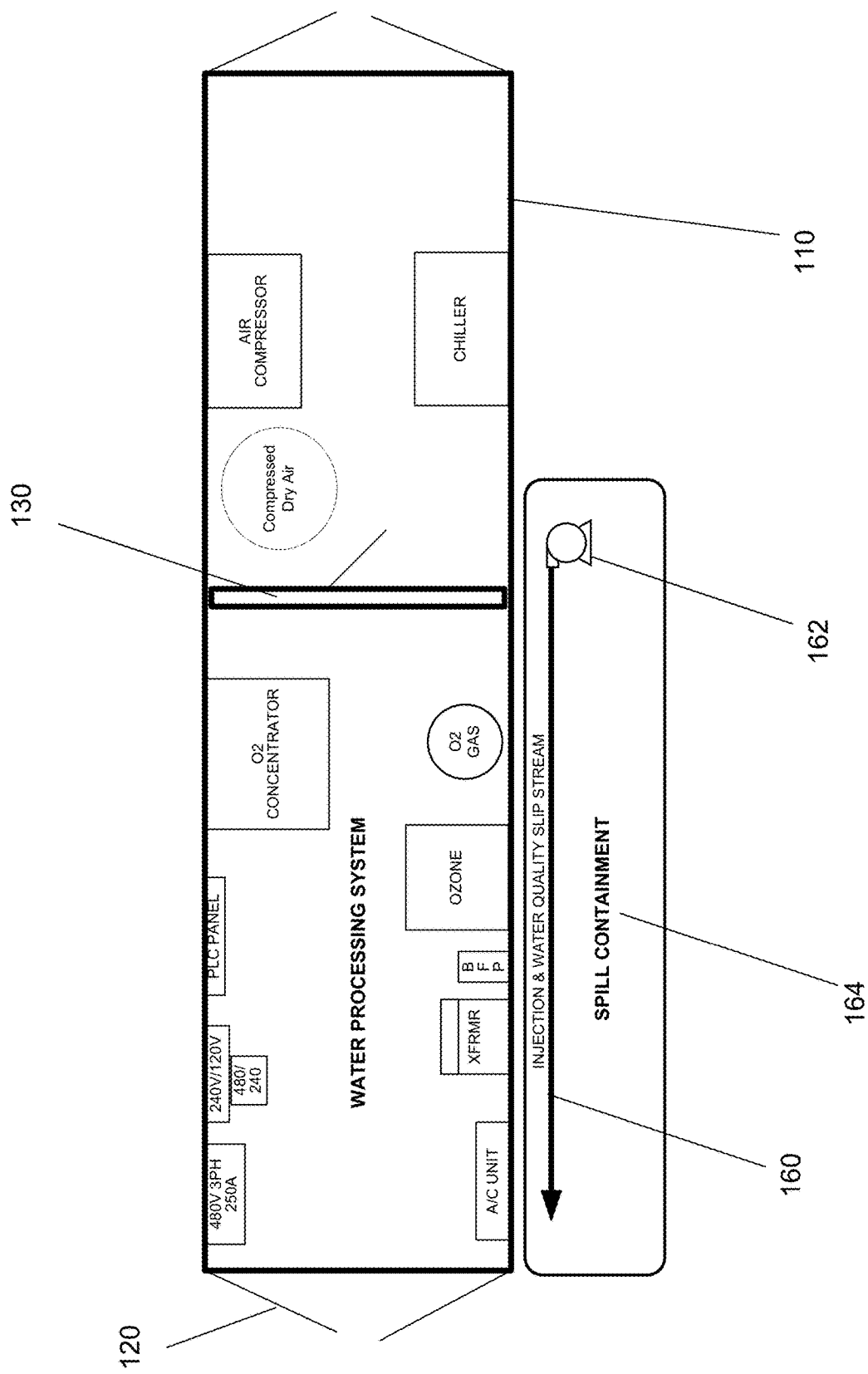
FIG. 12 shows a top view of a single unit embodiment of the present system.

FIG. 12 shows a top view of a schematic diagram of an exemplary insulated container 110 30 feet long and 7.5 feet wide with double doors 120 at one or both ends. The air/water handling system (e.g., air compressor, chiller, CDA) and water processing systems (O2 concentrator, O2 tank, ozone tank, injection system) are both contained in the same unit, and may be separated by an insulated panel 130 which also may have a door. The system in this configuration has a processing capacity of 15,000 BPD (barrels per day). The interior comprises power supply connections, programmable logic controller (PLC), air compressor, compressed/clean dry air package, oxygen concentrator, oxygen gas tank, chilling unit, ozone generator, air conditioning unit, transformer, quality testing unit, and fluid connections and pumps (as also seen in FIGS. 8-10). On one side of the unit is the injection and water quality "slipstream" piping 160 with pump(s) 162, which may be contained in or suspended above a spill containment tank, pool, or pit. Some of the slipstream piping may or may not enter the interior of the unit, although as shown, the slipsteam piping is outside and adjacent thereto.

Figure 13:
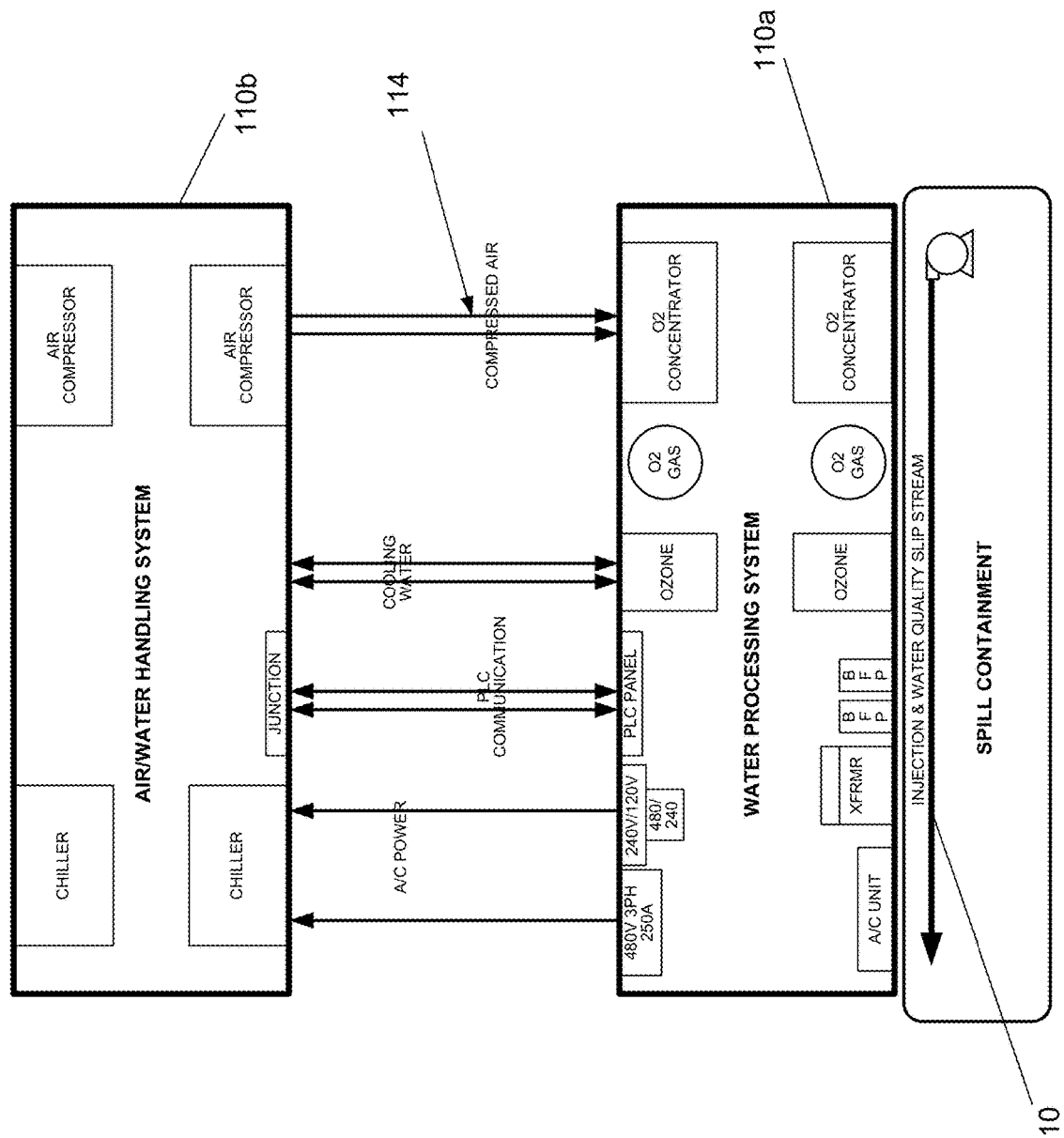
FIGS. 13-15 show top views of a dual unit embodiment of the present system.
Figure 14:
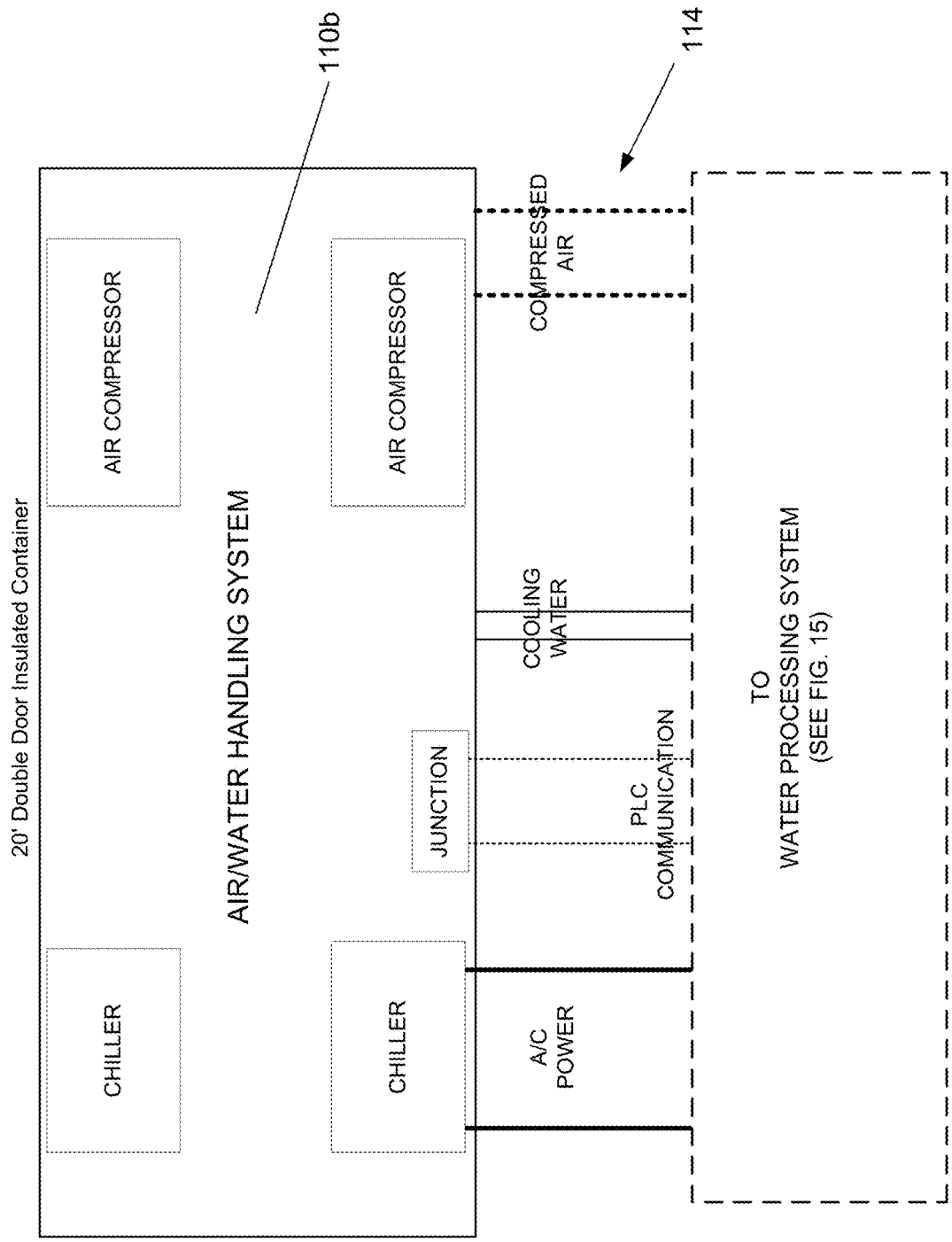
Figure 15:
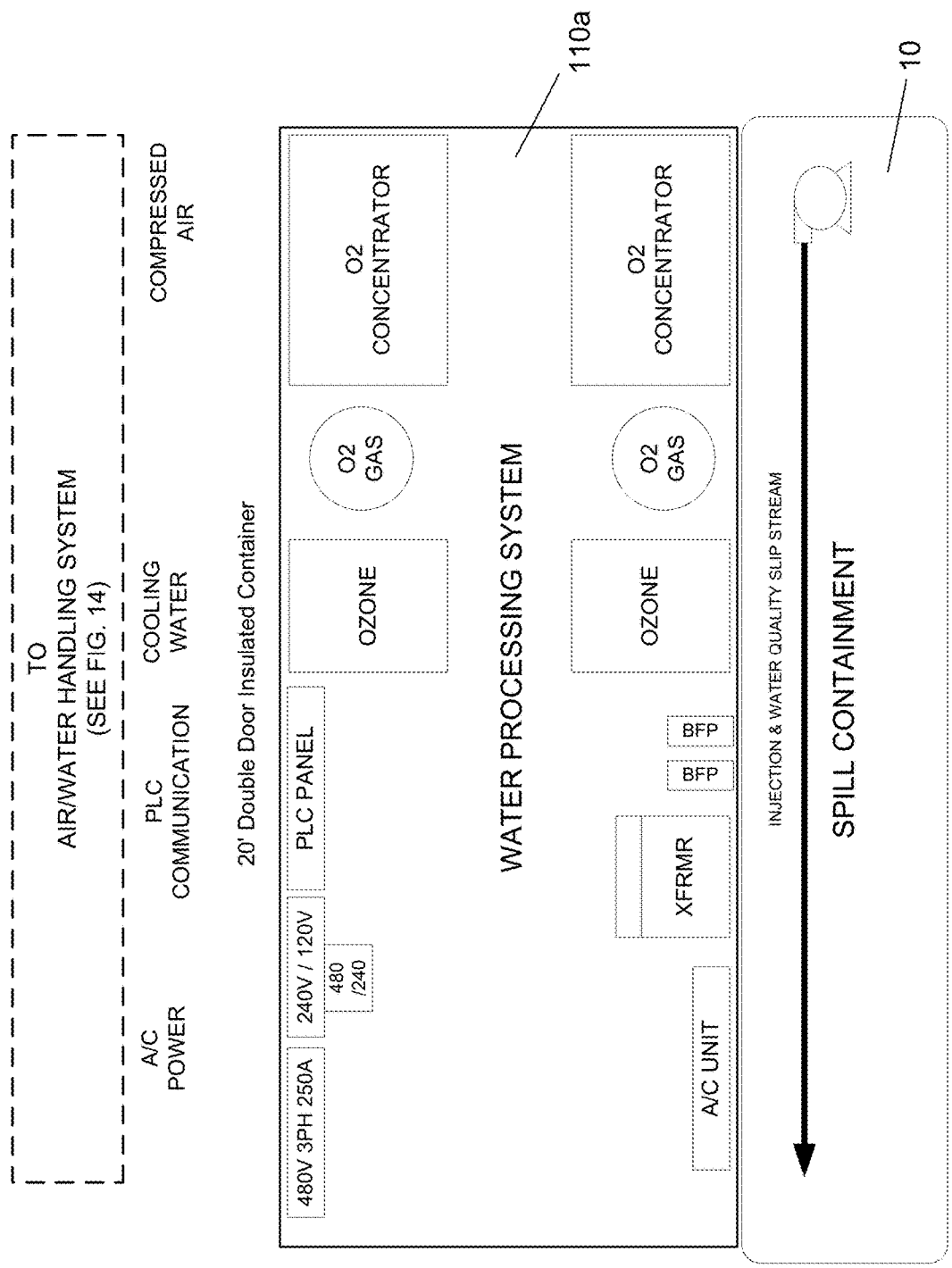

FIGS. 13-15 shows a top view of dual container units 110a, 110b (FIG. 13 shows a view of both units, FIG. 14 shows a close-up view of the "remote" air/water handling system unit not directly connected to the slipstream piping, and FIG. 15 shows a close-up view of the water processing unit with the slipstream piping), each 20 feet long, with a processing capacity of 30,000 BPD. Several system components are doubled (e.g., two chillers, two air compressors, two ozone tanks, two 02 concentrators, and so on) for greater capacity, and the air/water handling system and water processing system are separately installed in respective container units as shown. Piping and conduits 114 extend between the units (e.g., A/C power conduits/cables, PLC communication conduits/cables, cooling water pipes, compressed air pipes).

While the figures show a side-by-side dual configuration, other configurations with two or more container units are possible, and are within the scope of this invention. The container units may be of various sizes, and the components therein may vary in placement and size from the figures.

In several embodiments, combined systems may be used to introduce ozone/oxygen (as described above) prior to or just prior to injection for "on-the-fly" disinfection and treatment, while also providing friction reduction benefits, in combination with a secondary nitrogen nano-bubble system that introduces nitrogen or nitrogen-rich gas in the form of micro- and/or nano-bubbles (through nano-bubble diffusers) to increase or optimize friction reduction. The nitrogen nano-bubble delivery system may be contained in a container(s) or trailer(s) in the same manner as described above for oxygen/ozone systems. The nitrogen nano-bubble delivery system 200 also may be used independently (i.e., without the ozone/oxygen system) as an "on-the-fly" stand-alone friction reduction system. A nitrogen concentrator also may be used to add nitrogen or increase the nitrogen concentration in a gas prior to forming the bubbles.

Figure 16:
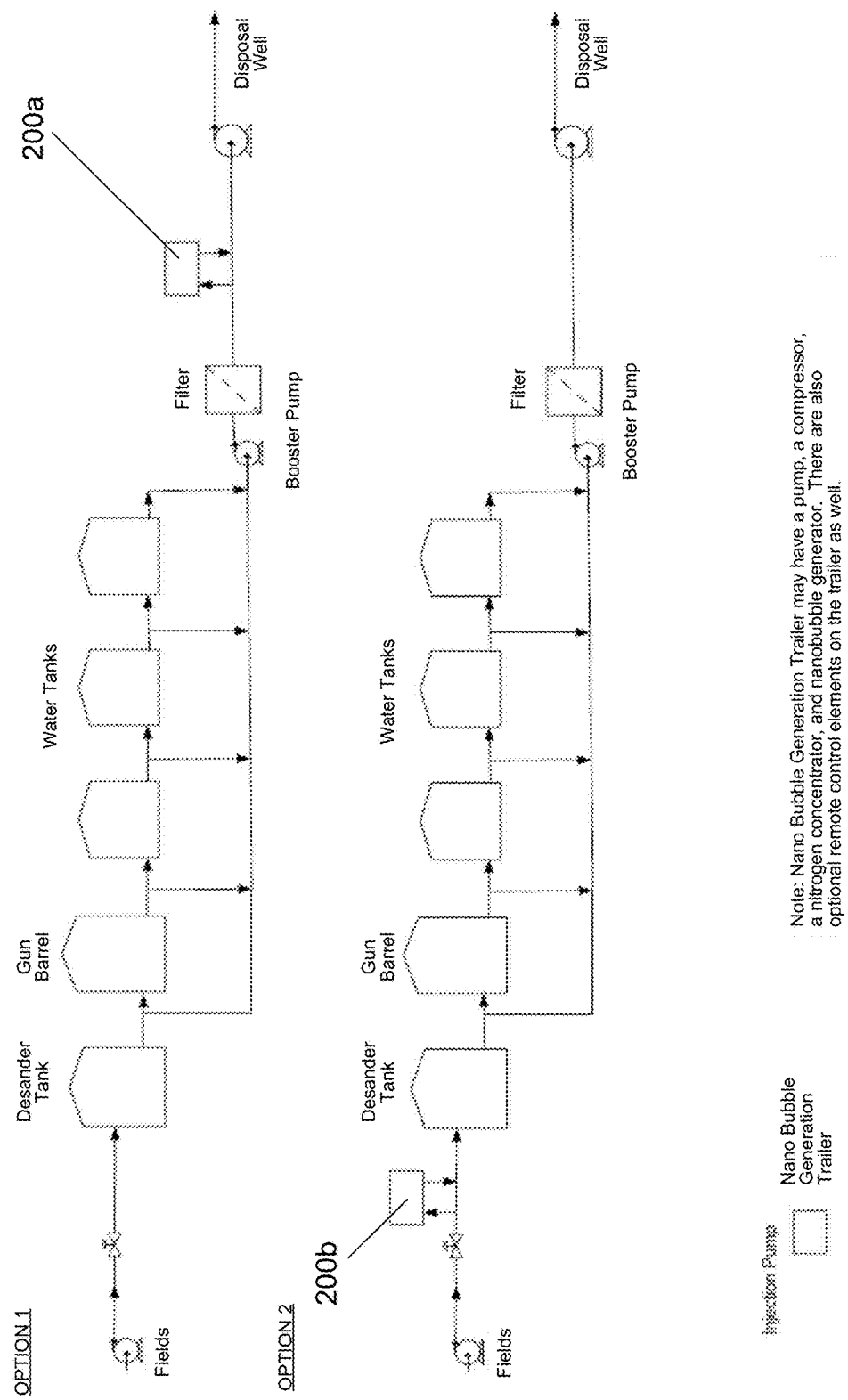
FIGS. 16-19 show examples of combined systems with friction reduction.
Figure 17:
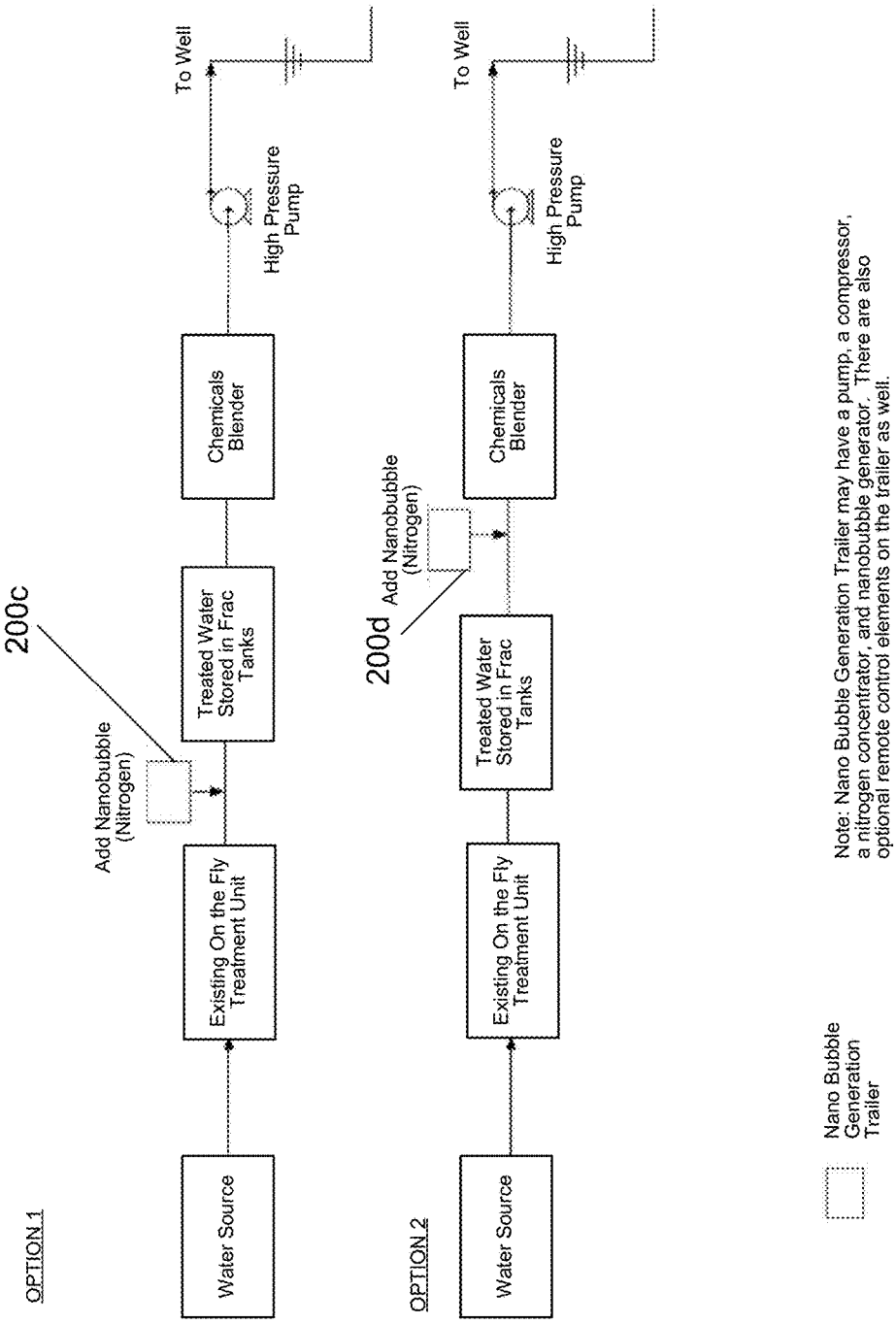
Figure 19:
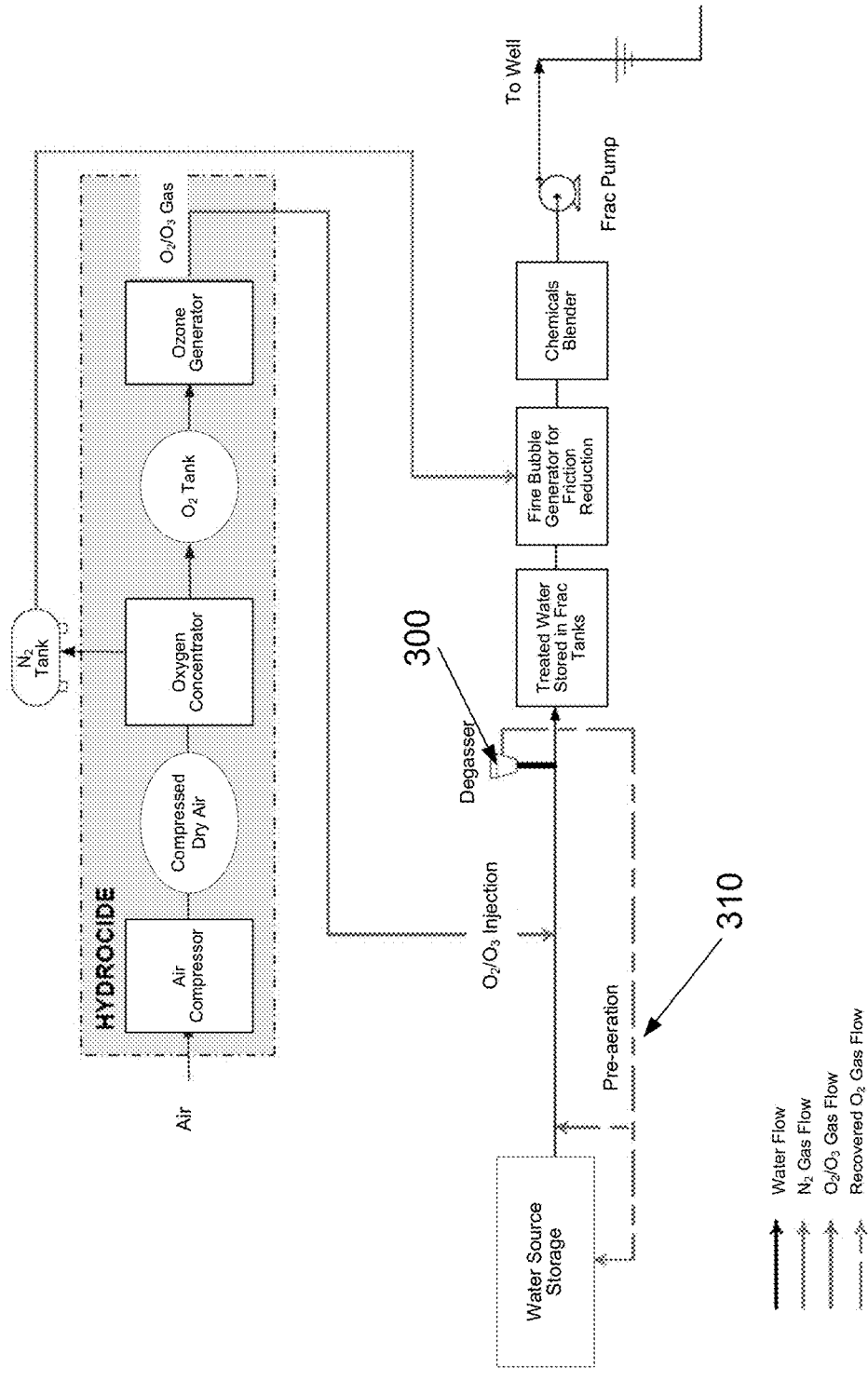

FIG. 16 shows two examples of optional placement for a nitrogen nano-bubble delivery system 200a, b at an oil/gas produced water (e.g., salt water) disposal facility. As seen, the system may be located just prior to 200a injection in the disposal well, or further upstream, such as prior to 200b treatment in a desander tank and gun barrel tanks (as described above). FIGS. 17 and 19 show similar options for fracking water treatment (e.g., typically prior to 200c or after 200d storage in the frac water tanks).

Figure 18:
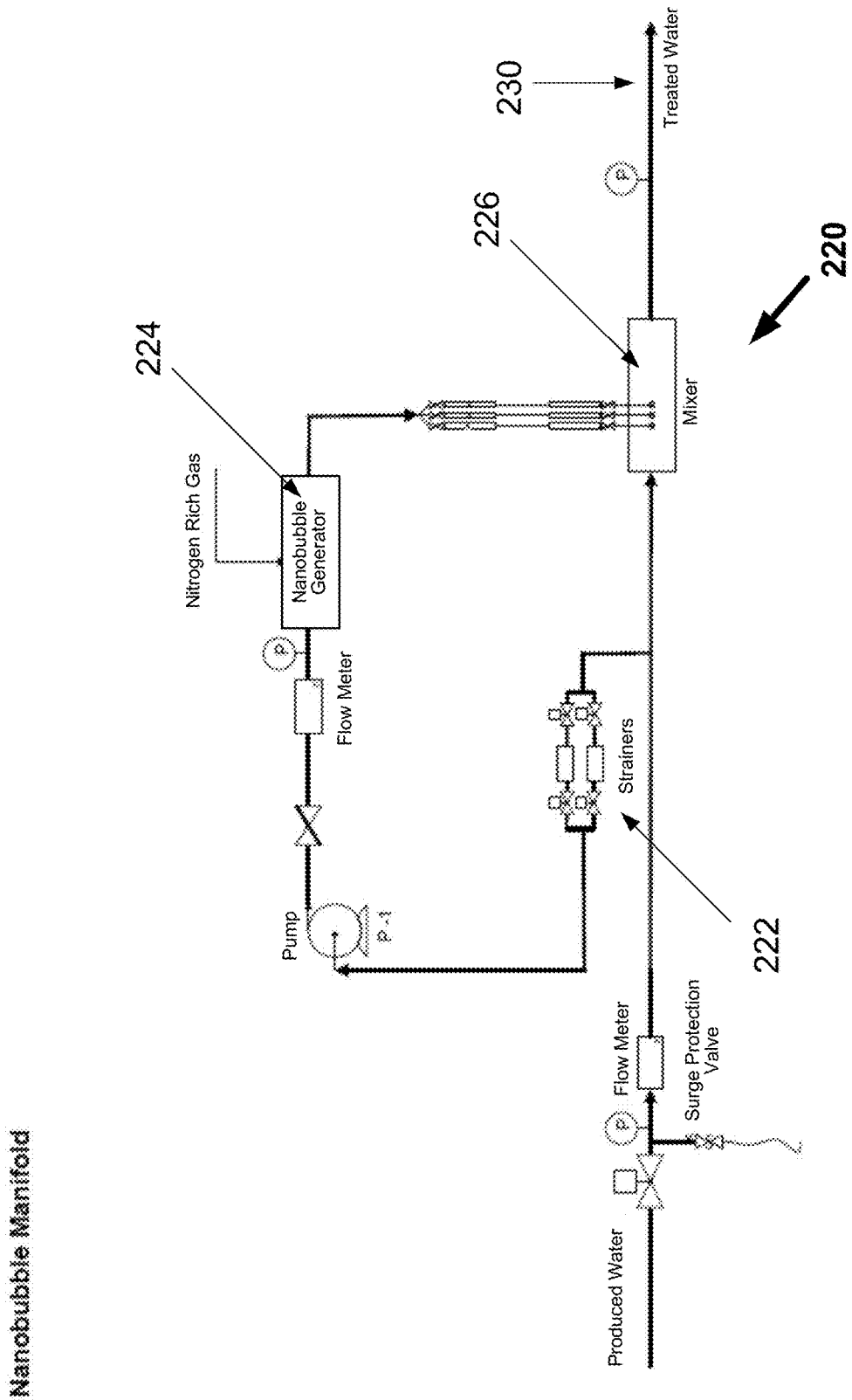

FIG. 18 shows a schematic of a nitrogen nano-bubble delivery manifold 220. A portion of produced water is drawn off, passed through strainers 222, and injected with nitrogen nano-bubbles 224, then mixed 226 back with the produced water. The treated water 230 then flows downstream for further treatment (if any) and injection. Flow meters are used to monitor fluid flow and control the introduction rates of nitrogen nano-bubbles.

Figure 20:
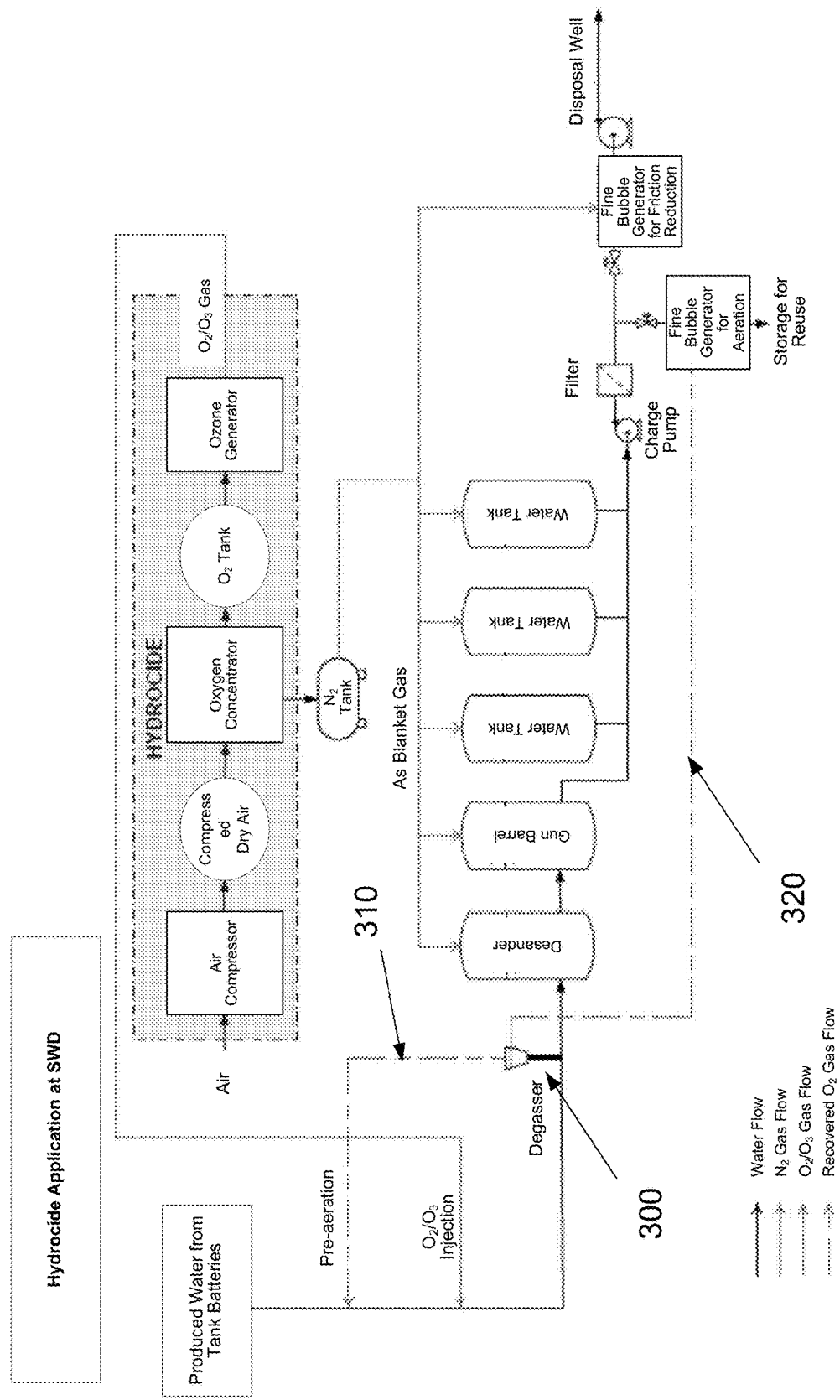
FIGS. 20-21 show examples of an oxygen de-aeration or de-gassing system in combination with one or more of the above systems.
Figure 21:
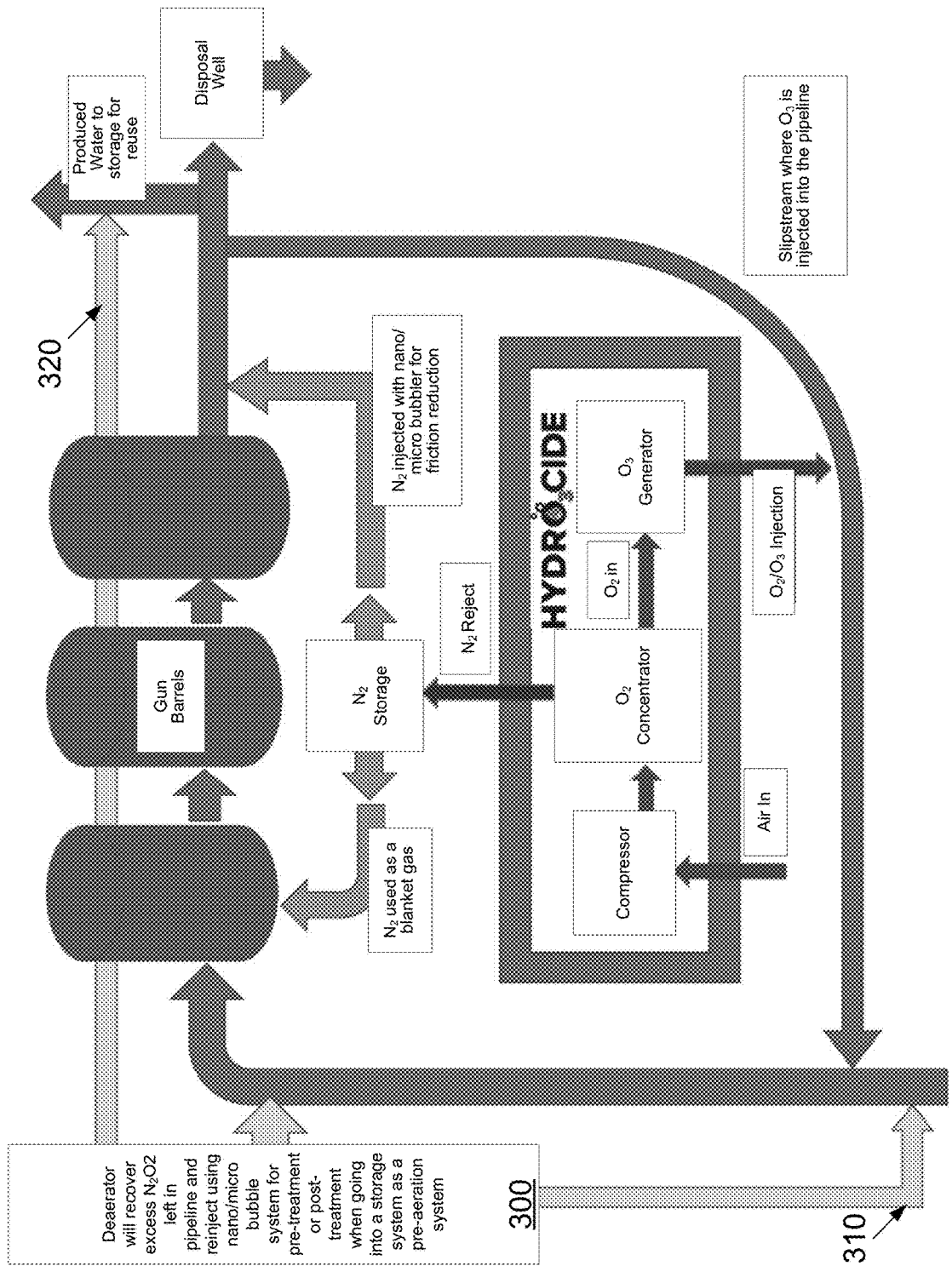

In further additional embodiments, as seen in FIG. 19-21, during the ozone/oxygen injection step described above, the ozone reacts almost immediately, but some of the oxygen in larger bubbles will phase separate and create gas pockets within the pipeline. This gas typically off-gasses at the first release point. By use of a de-aerator or de-gasser 300 (e.g., a riser under a vacuum), as seen in FIGS. 19-21, separated oxygen may be recovered and re-injected using a nano/micro-bubble type injection system. This will allow the oxygen to stay in suspension and provide additional treatment/oxidation from the reinjected oxygen. This oxygen gas stream may be reinjected as a pre-aeration step upstream 310 (either into water source storage or otherwise prior to the oxygen/ozone injection point) of the treatment by the main system to provide pre-treatment. Alternatively, such as in addition to pre-treatment or when pre-treatment is not necessary, the injected oxygen gas can be added into the water post-treatment 320 as a pre-aeration step or post-aeration step for produced water going into a storage system. Produced water going into a storage system is typically aerated to preserve the water. This posttreatment option will reduce and possibly eliminate the need for aeration during the storage phase. FIG. 20 shows a salt-water or saline-water disposal operation, with both upstream 310 and downstream 320 injection of oxygen gas.

Carbon Sequestration

In various exemplary embodiments, the present invention comprises a combined aeration system supplemented with a nanobubble delivery system to sequester and/or store carbon, typically in the form of carbon dioxide ($CO_2$) (i.e., "carbon sequestration"). As described in detail herein, produced water is generated as a byproduct of oil and gas extraction. Carbon dioxide is a pollutant emitted from oil and gas activities. Carbon dioxide is highly soluble in water, but this solubility is reduced at higher temperatures and/or salinities. Produced water at the wellhead often is in excess of 100 degrees F. In addition, conventional means of injection limit the amount of $CO_2$ dissolved in water to its reported gas solubility limit. Salinity in water also reduces this gas solubility: as salinity increases, gas solubility decreases. Produced water is highly saline. While salinity may vary, $CO_2$ solubility in produced water typically is in the range of about 100 to about 400 ppm.

In the present invention, carbon dioxide is introduced to produced water in the form of "nanobubbles." Gases introduced into water form bubbles. Depending on the size of the bubbles and the solubility and stability of the gases, the bubbles may rise to the surface and produce "off gas," or may go into solution or be dissolved in the water. This process is dependent on the pressure and temperature of the water. Very small bubbles, called "nanobubbles," generally stay in suspension in the fluid, do not rise to the surface, and rely more on Brownian Motion for movement. Nanobubbles are also very stable and will remain in the water (or other fluid) for long periods of time (the stability of the particular gas being a factor). Nanobubbles also allow for much higher concentrations of gases to be introduced well beyond the saturation point, thereby allowing for super-saturated concentrations of the gas well above the reported gas solubility limit.

In several embodiments, the present invention comprises a nanobubble injection system that generates mostly $CO_2$ nanobubbles (i.e., 100 nm and smaller) and a small number of microbubbles (e.g., 10% or less). The nanobubble/microbubble ratio may vary based on the efficiency of the generator. Nanobubbles because of their size cannot overcome the viscosity of the fluid, and because nanobubbles have an increased zeta potential (i.e., repulsive force between bubbles) they do not coalesce to form bigger bubbles. This forces nanobubbles to remain in the fluid, trapped as an undissolved gas, until they react or dissolve. In contrast, the microbubbles will float and coalesce, forming larger bubbles that float upward faster. Floating to the surface does not provide the retention time for gas dissolution, so microbubbles will experience little, if any, dissolution in produced water. Further, the little gas dissolution that may be observed while the microbubble rises to the surface is limited by gas solubility. Nanobubbles transcend this gas solubility limit as they remain trapped in the fluid. The present invention thus allows $CO_2$ supersaturation (i.e., saturation well above the reported gas solubility limit) of produced water to allow more $CO_2$ to be absorbed and sequestered into produced water.

This supersaturation by $CO_2$ also may provide a friction reduction benefit which reduces pump pressure and utility cost for some applications, as discussed below. Friction reduction studies due to the gases indicate a 10% to 40% reduction in friction. Reductions in system pump pressures from 10%-20% similarly have been observed.

In water, carbon dioxide often will convert to carbonic acid, carbonates, and bicarbonates. This converted carbon dioxide does not enter the atmosphere as carbon dioxide gas. This process can be accelerated catalytically to form compounds such as calcium carbonate. In water storage systems, the formation of carbonates often increases the likelihood of "scaling" (although the use of scale inhibitors in oilfield water management can mitigate this). However, this concern is further mitigated as carbon dioxide in nanobubble form will itself help prevent scaling.

Aeration is a process of introducing oxygen into water to help control bacteria and improve the overall quality of the water. In the management of produced water, aeration is used as a pre-treatment to oxidation and to preserve disinfection. The higher temperature of produced water from the wellhead can be reduced through the process of aeration. This reduction in temperature allows more carbon dioxide to be absorbed by the produced water. This absorption process can be accelerated by adding carbon dioxide to the airstream used in the aeration process. Aeration in accordance with the present invention allows for additional carbon sequestration by decreasing the temperature of the produced water, and increasing the concentration of carbon dioxide introduced to the produced water.

Exemplary applications of the present invention are described below.

1. Produced Water Recycling/Re-Use.

Figure 22:
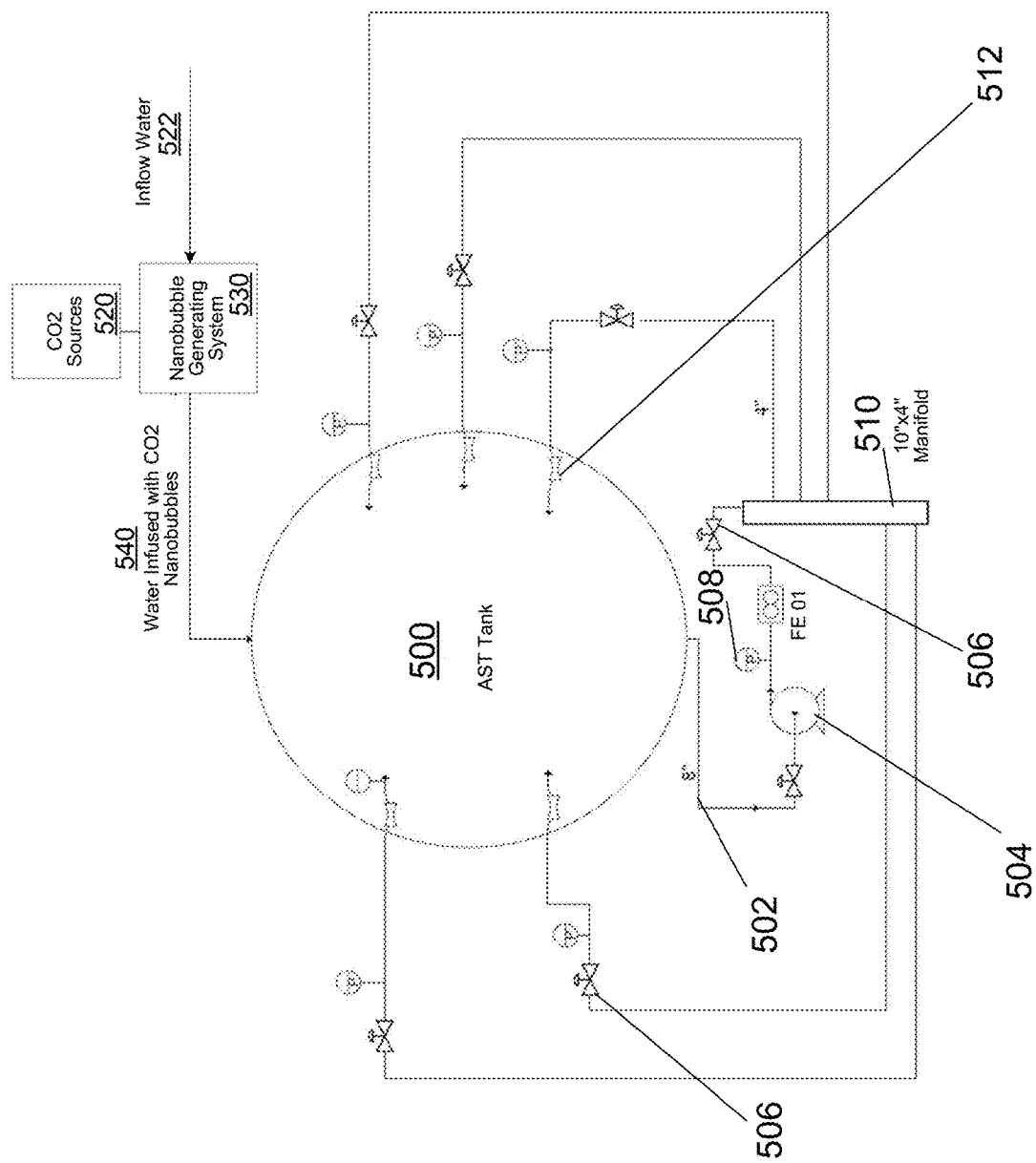
FIGS. 22-26 show diagrams of exemplary embodiments of the present invention with carbon dioxide introduction at various points and carbon sequestration.
Figure 23:
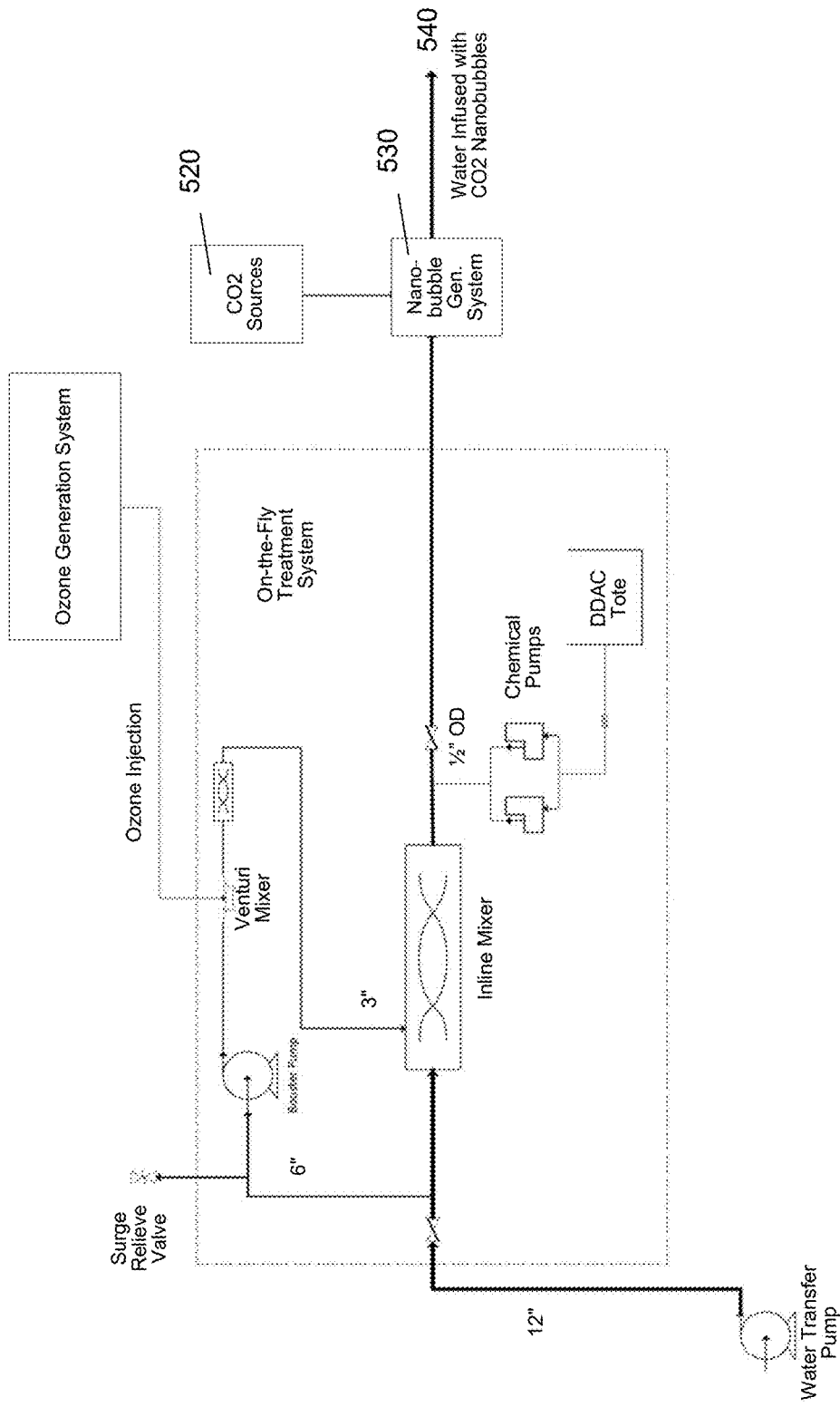
Figure 24:
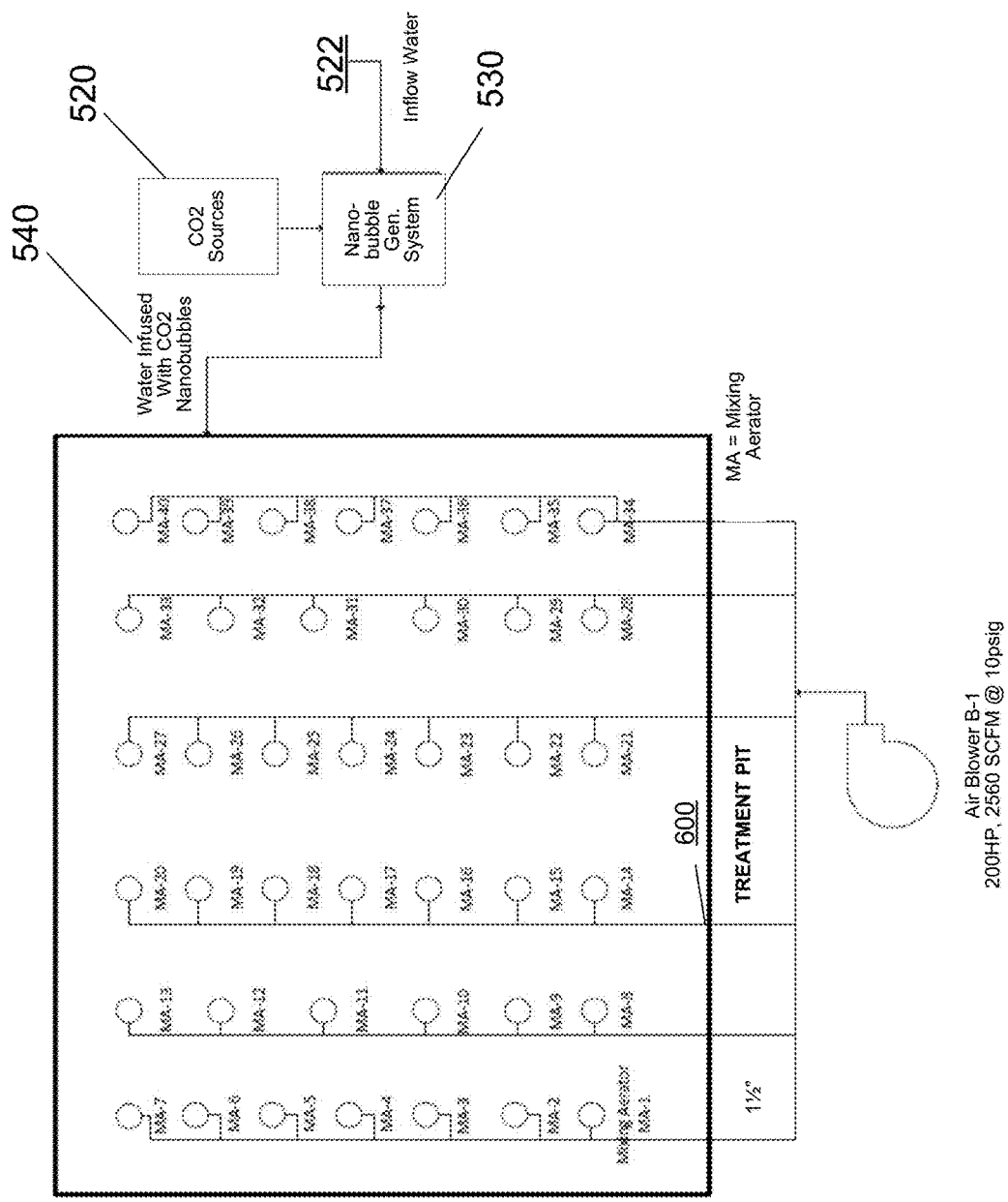

In produced water reuse/recycle applications, as seen in FIGS. 22-24, the produced water is stored in large pits and tanks (e.g., aboveground storage tank, or AST 500, or a treatment pit). Aeration is employed in these storage devices to preserve the water and provide ongoing bacterial control; in the embodiment show, produced water is removed from the AST 500 by pipe 502 and pump 504 (flow is controlled by various valves 506 and monitored by various meters 508). The produced water is then directed to a manifold 510 and reinjected back into the tank 500 through a plurality of pipes (with control valves and meters) with Venturi mixers 512 to agitate and promote mixing of the produced fluid in the tank.

The introduction of carbon dioxide in nanobubble form allow these storage devices to become carbon sequestration systems. Carbon dioxide from a source 520 is mixed with inflowing produced water 522 in a nanobubble generator 530 to produce water infused with carbon dioxide nanobubbles 540. The water becomes super-saturated with carbon dioxide through the creation and utilization of nanobubbles. The nanobubbles also will reduce the friction of the produced water while in storage (e.g., in a storage tank or tanks). The carbon dioxide nanobubble generation and/or delivery system may be contained in a container(s) or trailer(s) in the same manner as described above.

Figure 25:
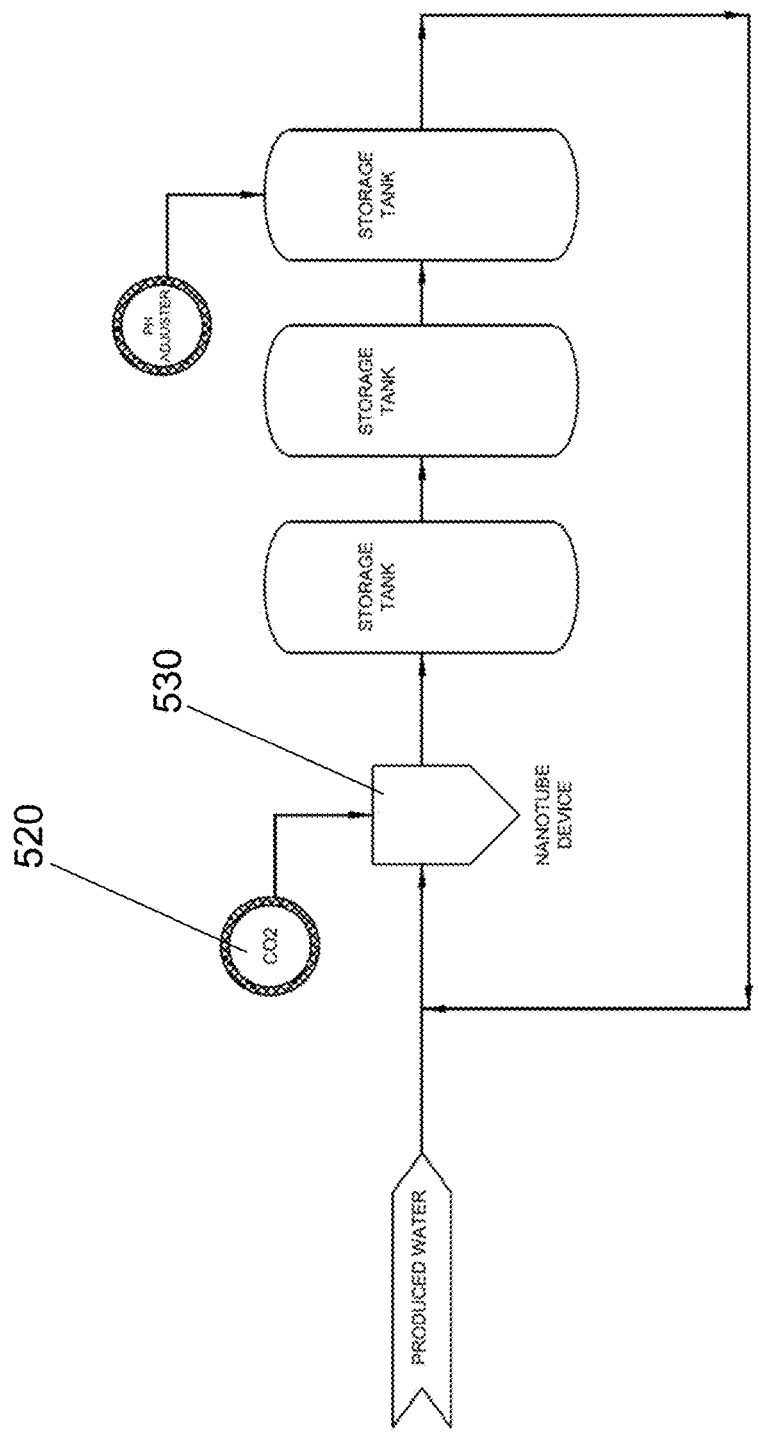
Figure 26:
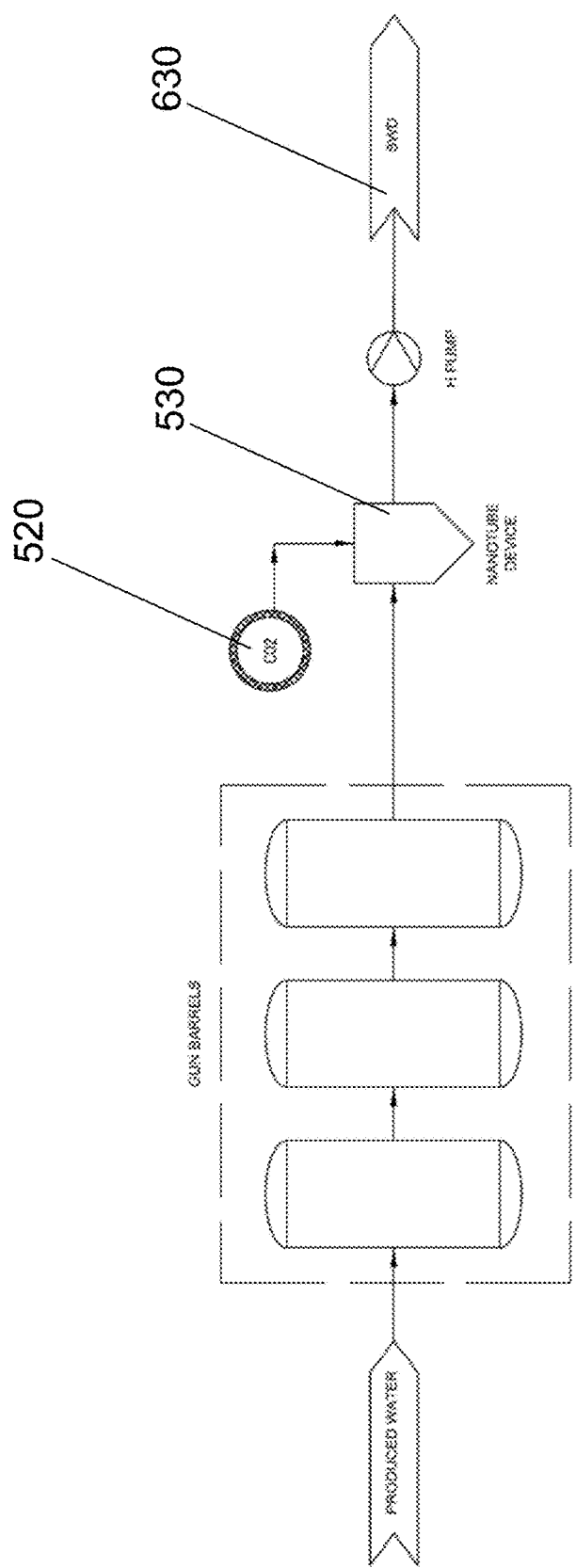
Figure 27:
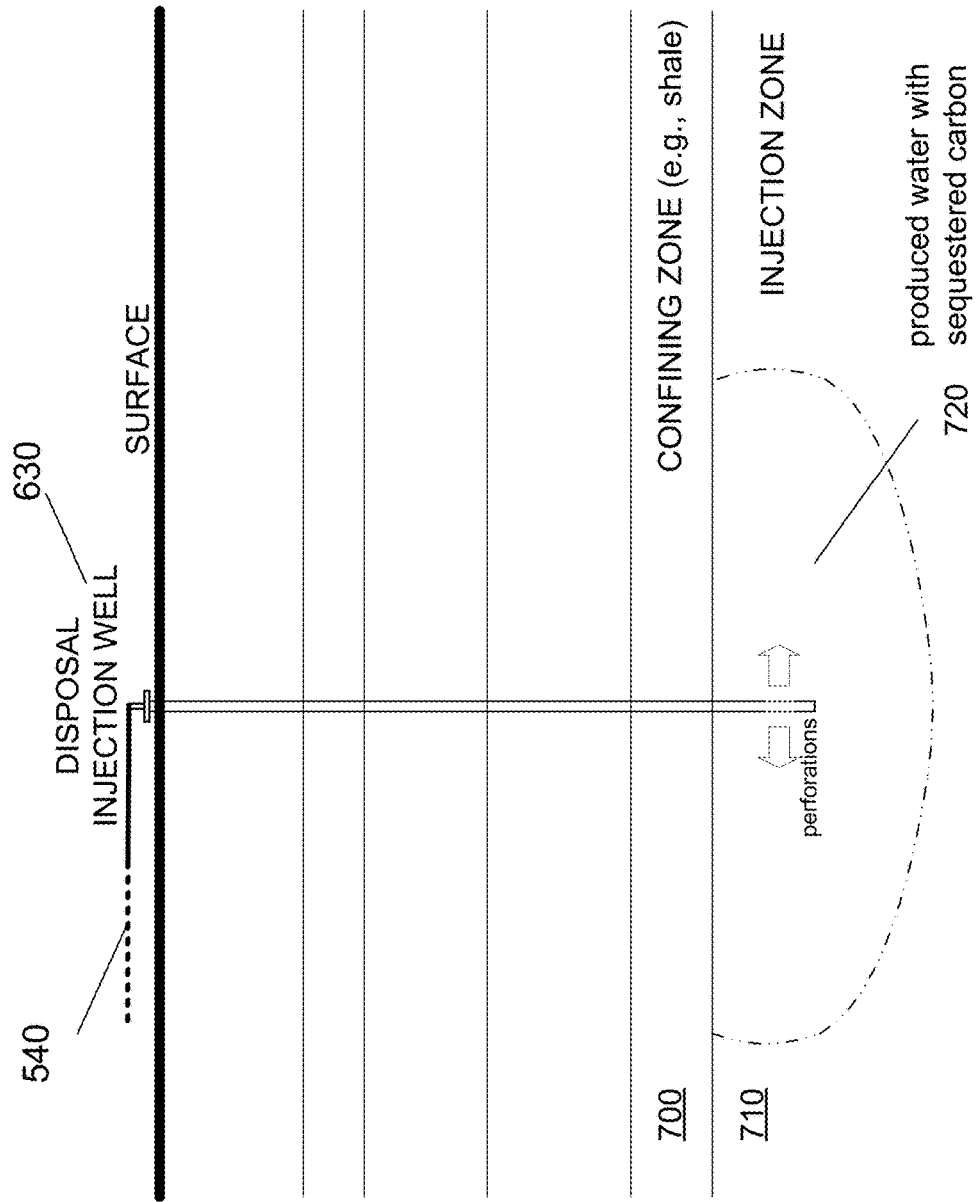
FIG. 27 shows a diagram of underground carbon sequestration in a "salt water disposal" system.

When the produced water is reused/recycled, as seen in FIG. 23 or 25, this reduced friction will reduce pump pressures and increase the efficiency of the pumps, thereby reducing emissions. When the produced water is disposed of in subsurface formations with Class II disposal wells 630 (sometimes referred to as SWD or "salt water disposal" wells), the present invention can supersaturate with nanobubble carbon dioxide the produced water that will be injected for disposal in the disposal well, as seen in FIGS. 26 and 27. The supersaturated produced water is injected into a subsurface formation or "injection zone" 700 which is typically confined by at least one overlying confining zone 710 that is relatively impermeable to water flow (e.g., shale). As more supersaturated produced water is injected, the outer boundary of the injection zone volume 720 with supersaturated produced water gradually expands This presence of carbon dioxide in nanobubble form will reduce friction and reduce pump costs, while providing the extra benefit of carbon sequestration in an existing Class II disposal well system.

The EPA's Underground Injection Control program consists of six classes of injection wells, which are regulated to protect underground sources of drinking water. Class II wells are used to inject fluids associated with oil and natural gas production. Class II fluids are primarily brines (i.e., salt water) that are produced as a part of extracting oil and gas. Class II wells include disposal wells and enhanced recovery wells.

Figure 29:
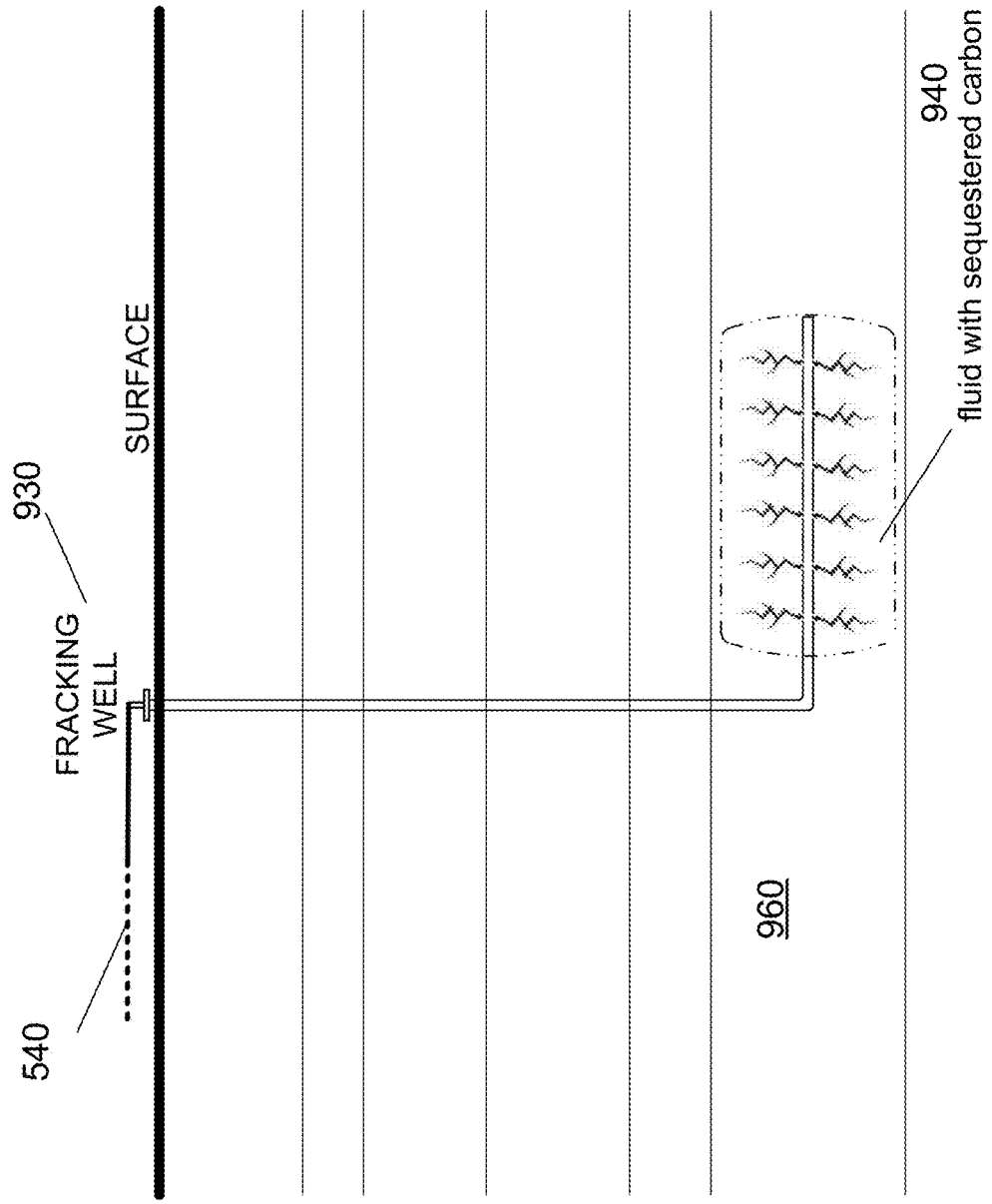
FIG. 29 shows a diagram of underground carbon sequestration in a completion fluid fracking system.

The supersaturated produced water also may be used as a completion fluid in a petroleum hydrocarbon well, including but not limited to a hydraulically fractured well, as seen in FIG. 29. In the latter case, the completion fluid is produced water used to complete the hydraulically fractured well 930 (produced water is commonly used to eliminate the need for fresh water). The present invention can be used to supersaturate the produced water being used as the completion fluid. This will reduce friction and reduce pump costs, thus reducing or eliminating the need for the use of a chemical friction reducer, which are often used with completion fluids. The well completion process also becomes an additional carbon sequestration system when the completion fluid with sequestered carbon 940 remains underground in the fractured formation 960.

2. Waterfloods/EOR.

Figure 28:
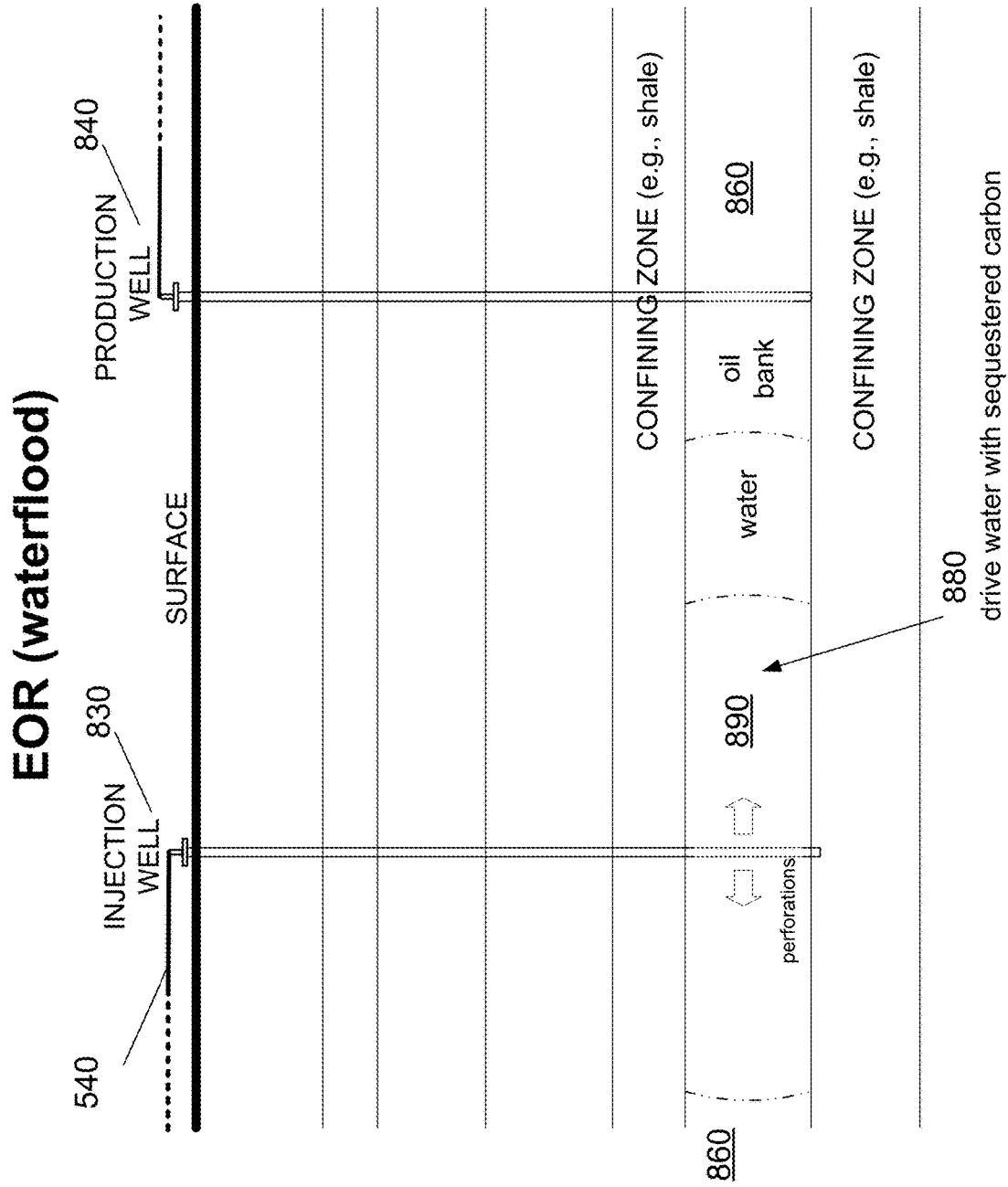
FIG. 28 shows a diagram of underground carbon sequestration in an "Enhanced Oil Recovery" waterflood system.

Class II injection wells, sometimes referred to as "waterflood wells" in this context, also are used for Enhanced Oil Recovery (EOR) applications, as seen in FIG. 28. In waterflood applications, water and produced water are used in conventional oil well development by being injected through a plurality of injection wells 830 into underground hydrocarbon reservoir/formations 840 to add pressure, thereby enhancing the recovery of oil from the formation (resulting in increased production from production wells 840 in that formation from an oil bank driven by the injected fluid).

As described above, the present invention can be used to supersaturate the produced water that will be injected as the "drive water" or "drive fluid" 880 for the waterflood EOR process. This will reduce friction and reduce pump costs as the invention improves the hydraulic characteristics of the injection water. This also results in a better storage process for the carbon dioxide, as carbon dioxide in the present invention remains in nanobubble form in the portion 890 of the formation into which the water with carbon dioxide in nanobubble form has been driven, until it goes into complete dissolution over a period of days. This is an advantage over the simple introduction of carbon dioxide gas to underground formations as a carbon sequestration technology, as the gas in that form (i.e., non-nanobubble) will often migrate upwards to the surface and re-enter the atmosphere, thereby reducing its effectiveness for carbon sequestration. As mentioned above, the present invention avoids the re-entering of carbon dioxide into the atmosphere. The $CO_2$ also may provide benefits in increasing oil recovery in waterflood operations.

3. Emissions Flaring.

Patton, U.S. patent application Ser. No. 16/653,864, filed Oct. 15, 2019, which is incorporated herein in its entirety by specific reference for all purposes, describes a system and apparatus for flaring hydrocarbon gas from oilfield operations using produced water (referred to as the "hydroflare process"). Emissions from flaring are scrubbed. Ozone may be added. In the flaring combustion process, carbon dioxide is formed, which can be captured through a variety of processes (e.g., amine systems). Carbon dioxide from the "hydroflare process" can be used for the applications and processes described above. A unique benefit from this use is combining the reduction of emissions from the treatment of oilfield gas with the increased carbon capture and sequestration through new uses for the captured carbon dioxide in nanobubble form. Introducing carbon dioxide in the form of nanobubbles provides a unique way of storing carbon dioxide in a stable form by injecting it underground, as described above, particularly where produced water is already being used as an injection fluid.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A method of carbon sequestration in conjunction with oil and gas operations, comprising the steps of:
   treating a produced water stream from oil and/or gas operations to remove or treat one or more contaminants therein;
   after treating the produced water stream, supersaturating the treated produced water stream with carbon dioxide nanobubbles; and
   injecting the supersaturated produced water stream into a well.

2. The method of claim 1, further comprising the step of, after the step of injecting, introducing at least a portion of the supersaturated produced water stream into one or more subsurface formations.

3. The method of claim 2, further comprising the sequestering carbon in the one or more subsurface formations into which the supersaturated produced water stream has been introduced.

4. The method of claim 1, wherein the well is a Class II injection well.

5. The method of claim 4, wherein the Class II injection well is a disposal well.

6. The method of claim 4, wherein the Class II injection well is a hydraulic fracturing well.

7. The method of claim 4, wherein the Class II injection well is an enhanced recovery well.

8. The method of claim 4, wherein the Class II injection well is a waterflood well.

9. The method of claim 1, further comprising the step of generating carbon dioxide nanobubbles.

10. The method of claim 9, wherein the carbon dioxide nanobubbles are generated, in whole or in part, in a moveable trailer.

11. The method of claim 1, wherein the step of treating comprises the step of:
injecting ozone or an ozone-oxygen mixture into the produced water stream.

12. The method of claim 11, wherein the step of treating further comprises the step of:
injecting nitrogen or a nitrogen-rich gas into the produced water stream.

13. The method of claim 1, wherein the step of treating comprises the steps of:
drawing a portion of produced water from the produced water stream;
injecting ozone or an ozone-oxygen mixture into the drawn portion of produced water; and
injecting the drawn portion with ozone or ozone-oxygen mixture into the produced water stream.

14. The method of claim 1, further comprising the step of decreasing the temperature of the produced water stream.

15. A method of carbon sequestration, comprising the steps of:
receiving a fluid stream;
treating the fluid stream to remove or treat one or more contaminants therein;
after treating the fluid stream, supersaturating the treated fluid stream with carbon dioxide nanobubbles;
injecting the supersaturated fluid stream into a well; and
sequestering carbon in the supersaturated fluid stream by injecting at least a portion of the supersaturated fluid stream into one or more subsurface formations.

16. The method of claim 15, wherein the fluid stream is produced water for oil and/or gas operations.

17. The method of claim 15, wherein the well is a Class II injection well.

18. The method of claim 17, wherein the Class II injection well is a disposal well or an enhanced recovery well.

* * * * *